United States Patent
Sullivan et al.

[11] Patent Number: 6,159,110
[45] Date of Patent: Dec. 12, 2000

[54] GOLF BALL UTILIZING SILICONE MATERIALS

[75] Inventors: Michael J. Sullivan, Chicopee, Mass.; Viutor Keller, Enfield, Conn.; Mark Binette, Ludlow, Mass.

[73] Assignee: Spalding Sports Worldwide, Inc.

[21] Appl. No.: 09/048,578

[22] Filed: Mar. 26, 1998

Related U.S. Application Data

[60] Provisional application No. 60/042,117, Mar. 28, 1997.

[51] Int. Cl.[7] ................................................ A63B 37/02
[52] U.S. Cl. .......................... 473/374; 473/376; 473/378
[58] Field of Search .................... 473/373, 374, 473/377, 385, 375, 376; 273/DIG. 29, DIG. 8

[56] References Cited

U.S. PATENT DOCUMENTS

| | | | |
|---|---|---|---|
| 2,258,333 | 10/1941 | Miller | 473/376 |
| 2,609,201 | 9/1952 | Martin | 473/373 |
| 2,764,572 | 9/1956 | Pechukas . | |
| 3,756,607 | 9/1973 | Lukinac et al. . | |
| 4,431,193 | 2/1984 | Nesbitt . | |
| 4,598,909 | 7/1986 | Ventura et al. | 273/DIG. 29 |
| 4,884,814 | 12/1989 | Sullivan | 473/385 X |
| 4,919,434 | 4/1990 | Saito | 473/376 |
| 4,955,966 | 9/1990 | Yuki et al. . | |
| 5,068,151 | 11/1991 | Nakamura . | |
| 5,120,791 | 6/1992 | Sullivan | 473/385 X |
| 5,314,187 | 5/1994 | Proudfit . | |
| 5,387,637 | 2/1995 | Sullivan . | |
| 5,730,655 | 3/1998 | Shimosaka et al. . | |
| 5,733,977 | 3/1998 | Takemura et al. | 473/377 X |
| 5,827,133 | 10/1998 | Chang | 473/377 X |

OTHER PUBLICATIONS

"Silicones" reprinted from Encyclopedia of Polymer Science and Engineering, vol. 15, Second Edition, pp. 204–308, 1989.

*Primary Examiner*—Mark S. Graham

[57] ABSTRACT

The present invention is directed to an improved golf ball comprising at least one interior layer and/or a core comprising a silicone material. The preferred silicone material has a tensile strength of from about 300 psi to about 600 psi. It is preferred to also utilize a multi-layer cover in conjunction with the silicone material(s). The resulting multi-layered golf ball of the present invention provides for enhanced distance without sacrificing playability or durability when compared to known multi-layer golf balls.

56 Claims, 3 Drawing Sheets

6,159,110

GOLF BALL UTILIZING SILICONE MATERIALS

CROSS REFERENCES TO RELATED APPLICATIONS

The present application claims priority from U.S. provisional patent application Ser. No. 60/042,117 filed Mar. 28, 1997.

FIELD OF THE INVENTION

The present invention relates to golf balls and, more particularly, to improved golf balls comprising one or more interior layers and/or a core comprising one or more silicone materials. The improved golf balls provide enhanced distance and durability properties while at the same time offering the "feel" and spin characteristics associated with certain prior art golf balls.

BACKGROUND OF THE INVENTION

A number of two-piece (a solid resilient center or core with a molded cover) and three-piece (a liquid or solid center, elastomeric winding about the center, and a molded cover) golf balls have been produced by the present inventors and others. The different types of materials utilized to formulate the cores, covers, etc. of these balls dramatically alters the balls' overall characteristics. In addition, multi-layered covers containing one or more ionomer resins have also been formulated in an attempt to produce a golf ball having the overall distance, playability and durability characteristics desired.

Despite the great numbers of different materials and combinations of materials utilized in prior art golf balls, there still remains a need for an improved golf ball exhibiting superior properties.

The present invention is directed to new golf ball compositions, preferably utilized in conjunction with multi-layer covers, which provide for enhanced coefficient of restitution (i.e, enhanced resilience or carrying distance) and/or durability properties when compared to the balls found in the prior art. As such, the playability characteristics (i.e., "feel", "click", "spin", etc.) are not diminished.

These and other objects and features of the invention will be apparent from the following summary and description of the invention, the drawings and from the claims.

SUMMARY OF THE INVENTION

The present invention provides, in one aspect, a golf ball comprising a core, a cover layer, and at least one interior layer surrounding the core. The core and/or the interior layer include one or more silicone materials. The silicone materials are silicone polymers, silicone fluids, silicone elastomers, and silicone resins.

In another aspect, the present invention provides a golf ball comprising a core, an inner cover layer molded on the core, an outer cover layer molded on the inner cover layer, and at least one interior layer between the core and the outer cover layer. The core and/or the interior layer(s) include a silicone material.

These and other objects and features of the invention will be apparent from the following detailed description.

DETAILED DESCRIPTION OF THE PREFERRED EMBODIMENTS

Figure 1:
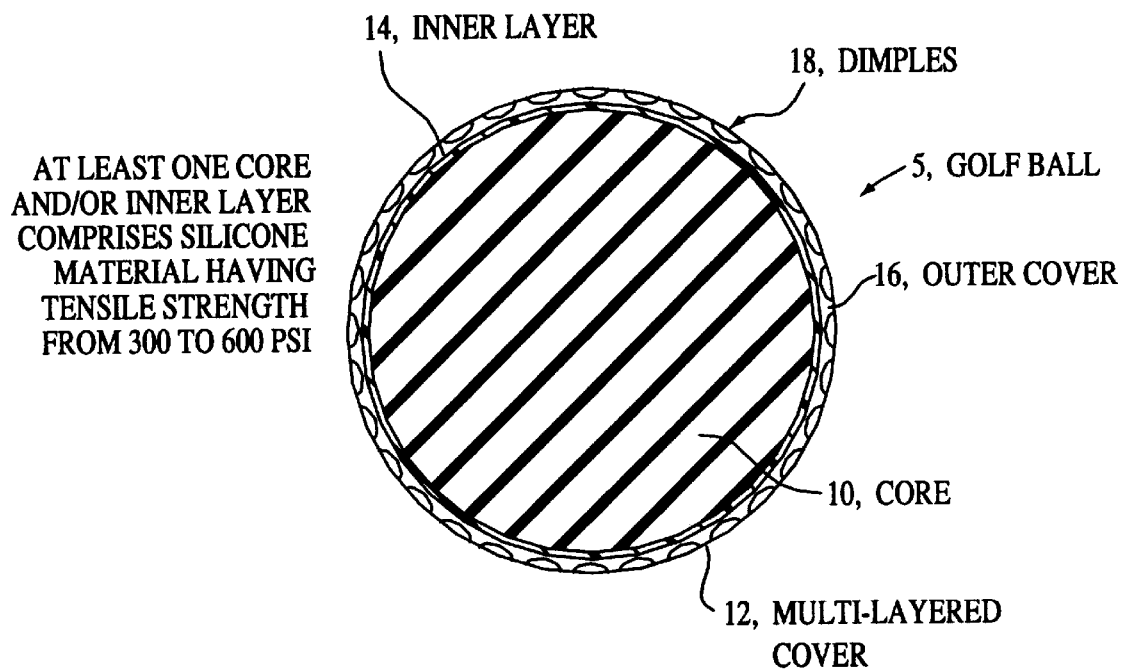
FIG. 1 is a cross-sectional view of a preferred embodiment golf ball in accordance with the present invention comprising a core and a cover having an inner layer and an outer dimpled layer.

The present invention is directed to golf balls comprising one or more silicone interior layers and/or a silicone core. The golf balls of the present invention preferably utilize a multi-layer cover as described herein. However, the golf balls may instead utilize conventional cover materials such as balata or blends of balata with elastomeric or plastic materials.

The novel multi-layer golf ball covers of the present invention preferably include a first or inner layer or ply of a high acid (greater than 16 weight percent acid) ionomer or ionomer blend and second or outer layer or ply comprised of a comparatively softer, low modulus ionomer, ionomer blend or other non-ionomeric thermoplastic elastomer such as polyurethane, a polyester elastomer such as Hytrel® polyester elastomer of E.I. DuPont de Nemours & Company, or a polyesteramide such as the Elf Atochem S.A. Pebax® polyesteramide. Preferably, the outer cover layer includes a blend of hard and soft low acid (i.e. 16 weight percent acid or less) ionomers.

It has been found that the recently developed high acid ionomer based inner cover layer, provides for a substantial increase in resilience (i.e., enhanced distance) over known multi-layer covered balls. The softer outer cover layer provides for desirable "feel" and high spin rate while maintaining respectable resiliency. The soft outer layer allows the cover to deform more during impact and increases the area of contact between the club face and the cover, thereby imparting more spin on the ball. As a result, the soft cover provides the ball with a balata-like feel and playability characteristics with improved distance and durability. Consequently, the overall combination of the inner and outer cover layers results in a golf ball having enhanced resilience (improved travel distance) and durability (i.e. cut resistance, etc.) characteristics while maintaining and in many instances, improving the ball's playability properties.

The combination of a high acid ionomer or ionomer blend inner cover layer with a soft, relatively low modulus ionomer, ionomer blend or other non-ionomeric thermoplastic elastomer outer cover layer provides for excellent overall coefficient of restitution (i.e., excellent resilience) because of the improved resiliency produced by the inner cover layer. While some improvement in resiliency is also produced by the outer cover layer, the outer cover layer generally provides for a more desirable feel and high spin, particularly at lower swing speeds with highly lofted clubs such as half wedge shots.

Two principal properties involved in golf ball performance are resilience and hardness. Resilience is determined by the coefficient of restitution (C.O.R.), the constant "e" which is the ratio of the relative velocity of two elastic spheres after direct impact to that before impact. As a result, the coefficient of restitution ("e") can vary from 0 to 1, with 1 being equivalent to an elastic collision and 0 being equivalent to an inelastic collision.

Resilience (C.O.R.), along with additional factors such as club head speed, angle of trajectory and ball configuration (i.e., dimple pattern) generally determine the distance a ball will travel when hit. Since club head speed and the angle of trajectory are factors not easily controllable by a manufacturer, factors of concern among manufacturers are the coefficient of restitution (C.O.R.) and the surface configuration of the ball.

The coefficient of restitution (C.O.R.) in solid core balls is a function of the composition of the molded core and of the cover. In balls containing a wound core (i.e., balls comprising a liquid or solid center, elastic windings, and a cover), the coefficient of restitution is a function of not only the composition of the center and cover, but also the composition and tension of the elastomeric windings. That is, both the core and the cover contribute to the coefficient of restitution.

In this regard, the coefficient of restitution of a golf ball is generally measured by propelling a ball at a given speed against a hard surface and measuring the ball's incoming and outgoing velocity electronically. As mentioned above, the coefficient of restitution is the ratio of the outgoing velocity to the incoming velocity. The coefficient of restitution must be carefully controlled in all commercial golf balls in order for the ball to be within the specifications regulated by the United States Golf Association (U.S.G.A.). Along this line, the U.S.G.A. standards indicate that a "regulation" ball cannot have an initial velocity (i.e., the speed off the club) exceeding 255 feet per second. Since the coefficient of restitution of a ball is related to the ball's initial velocity, it is highly desirable to produce a ball having sufficiently high coefficient of restitution to closely approach the U.S.G.A. limit on initial velocity, while having an ample degree of softness (i.e., hardness) to produce enhanced playability (i.e., spin, etc.).

The hardness of the ball is the second principal property involved in the performance of a golf ball. The hardness of the ball can affect the playability of the ball on striking and the sound or "click" produced. Hardness is determined by the deformation (i.e., compression) of the ball under various load conditions applied across the ball's diameter (i.e., the lower the compression value, the harder the material). As indicated in U.S. Pat. No. 4,674,751, softer covers permit the accomplished golfer to impart proper spin. This is because the softer covers deform on impact significantly more than balls having "harder" ionomeric resin covers. As a result, the better player is allowed to impart fade, draw or backspin to the ball thereby enhancing playability. Such properties may be determined by various spin rate tests.

Another important feature of the present invention golf balls is the use of one or more interior layers of a silicone composition. In addition to, or instead of, such silicone layers, the present invention golf balls may also comprise a core of a silicone composition. These silicone materials and their incorporation into the present invention golf balls are described in greater detail below.

Figure 2:
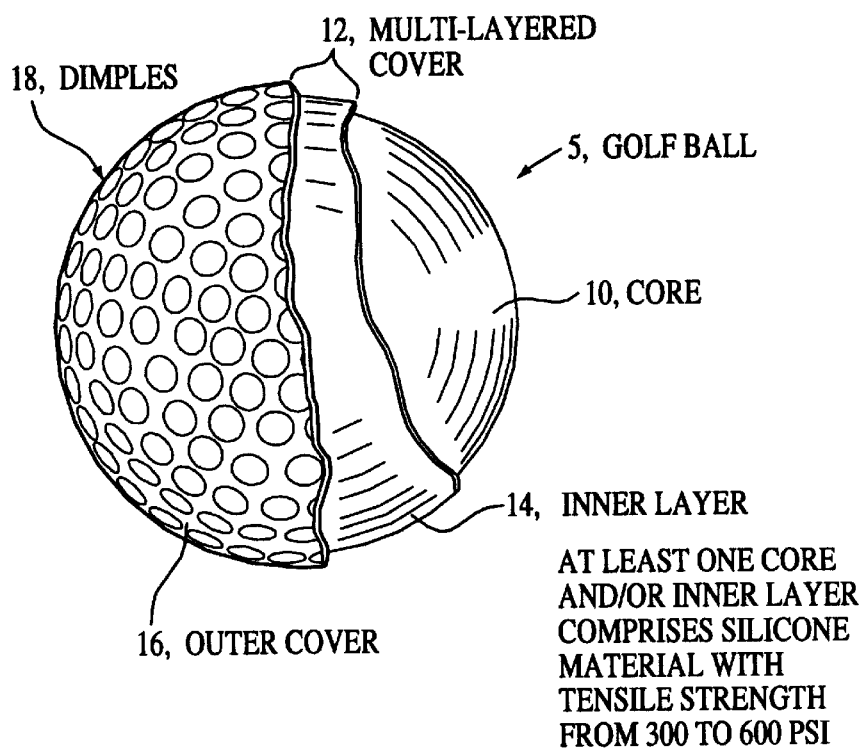
FIG. 2 is a diametrical cross-sectional view of the golf ball illustrated in FIG. 1 having a core and a cover comprising an inner layer and an outer layer having dimples.

FIGS. 1 and 2 illustrate a preferred embodiment golf ball 5 in accordance with the present invention. The golf ball 5 comprises a multi-layered cover 12 disposed about a solid core 10. The present invention also provides a method for making such golf balls. It will be understood that the referenced figures, i.e. FIGS. 1–8, are not to scale. And so, thicknesses of the various layers may be less (or greater) than illustrated in the figures.

The multi-layered cover 12 comprises two layers: a first or inner cover layer or ply 14 and a second or outer cover layer or ply 16. The outer layer 16 defines a plurality of dimples 18. The inner layer 14 is comprised of a high acid (i.e. greater than 16 weight percent acid) ionomer resin or high acid ionomer blend. Preferably, the inner layer is comprised of a blend of two or more high acid (i.e. at least 16 weight percent acid) ionomer resins neutralized to various extents by different metal cations. The inner cover layer may or may not include a metal stearate (e.g., zinc stearate) or other metal fatty acid salt. The primary purpose of the metal stearate or other metal fatty acid salt is to lower the cost of production without affecting the overall performance of the finished golf ball.

Inner Cover Layer

The inner layer compositions include the high acid ionomers such as those recently developed by E. I. DuPont de Nemours & Company under the trademark "Surlyn®" and by Exxon Corporation under the trademark "Escor®" or tradename "Iotek", or blends thereof. Examples of compositions which may be used as the inner layer herein are set forth in detail in U.S. Pat. No. 5,688,869, incorporated herein by reference. Of course, the inner layer high acid ionomer compositions are not limited in any way to those compositions set forth in that '869 patent. For example, the high acid ionomer resins recently developed by Spalding & Evenflo Companies, Inc., the assignee of the present invention, and disclosed in the '869 patent, may also be utilized to produce the inner layer of the multi-layer cover used in the present invention.

The high acid ionomers which may be suitable for use in formulating the inner layer compositions of the subject invention are ionic copolymers which are the metal, i.e., sodium, zinc, magnesium, etc., salts of the reaction product of an olefin having from about 2 to 8 carbon atoms and an unsaturated monocarboxylic acid having from about 3 to 8 carbon atoms. Preferably, the ionomeric resins are copolymers of ethylene and either acrylic or methacrylic acid. In some circumstances, an additional comonomer such as an acrylate ester (i.e., iso- or n-butylacrylate, etc.) can also be included to produce a softer terpolymer. The carboxylic acid groups of the copolymer are partially neutralized (i.e., approximately 10–75%, preferably 30–70%) by the metal ions. Each of the high acid ionomer resins which may be included in the inner layer cover compositions of the invention contains greater than about 16% by weight of a carboxylic acid, preferably from about 17% to about 25% by weight of a carboxylic acid, more preferably from about 18.5% to about 21.5% by weight of a carboxylic acid.

Although the inner layer cover composition preferably includes a high acid ionomeric resin and the scope of the patent embraces all known high acid ionomeric resins falling within the parameters set forth above, only a relatively limited number of these high acid ionomeric resins have recently become commercially available.

The high acid ionomeric resins available from Exxon under the designation "Escor®" and or "Iotek", are somewhat similar to the high acid ionomeric resins available under the "Surlyn®" trademark. However, since the Escor®/Iotek ionomeric resins are sodium or zinc salts of poly (ethylene-acrylic acid) and the "Surlyn®" resins are zinc, sodium, magnesium, etc. salts of poly(ethylene-methacrylic acid), distinct differences in properties exist.

Examples of the high acid methacrylic acid based ionomers found suitable for use in accordance with this invention include Surlyn® AD-8422 (sodium cation), Surlyn® 8162 (zinc cation), Surlyn® SEP-503-1 (zinc cation), and Surlyn® SEP-503-2 (magnesium cation). According to DuPont, all of these ionomers contain from about 18.5 to about 21.5% by weight methacrylic acid.

More particularly, Surlyn® AD-8422 is currently commercially available from DuPont in a number of different grades (i.e., AD-8422-2, AD-8422-3, AD-8422-5, etc.) based upon differences in melt index. According to DuPont, Surlyn® AD-8422 offers the following general properties, as set forth below in Table 1, when compared to Surlyn® 8920, the stiffest, hardest of all of the low acid grades (referred to as "hard" ionomers in U.S. Pat. No. 4,884,814).

TABLE 1

General Properties of Surlyn ® Ionomers

| | LOW ACID (15 wt % Acid) | HIGH ACID (>20 wt % Acid) | |
|---|---|---|---|
| | SURLYN ® 8920 | SURLYN ® 8422-2 | SURLYN ® 8422-3 |
| IONOMER | | | |
| Cation | Na | Na | Na |
| Melt Index | 1.2 | 2.8 | 1. |

TABLE 1-continued

General Properties of Surlyn ® Ionomers

| | LOW ACID (15 wt % Acid) | HIGH ACID (>20 wt % Acid) | |
|---|---|---|---|
| | SURLYN ® 8920 | SURLYN ® 8422-2 | SURLYN ® 8422-3 |
| Sodium, Wt % | 2.3 | 1.9 | 2.4 |
| Base Resin MI | 60 | 60 | 60 |
| MP[1], ° C. | 88 | 86 | 85 |
| FP[1], ° C. | 47 | 48.5 | 45 |
| COMPRESSION MOLDING[2] | | | |
| Tensile Break, psi | 4350 | 4190 | 5330 |
| Yield, psi | 2880 | 3670 | 3590 |
| Elongation, % | 315 | 263 | 289 |
| Flex Mod, K psi | 53.2 | 76.4 | 88.3 |
| Shore D hardness | 66 | 67 | 68 |

[1]DSC second heat, 10° C./min heating rate.
[2]Samples compression molded at 150° C. annealed 24 hours at 60° C. 8422-2, −3 were homogenized at 190° C. before molding.

In comparing Surlyn® 8920 to Surlyn® 8422-2 and Surlyn® 8422-3, it is noted that the high acid Surlyn® 8422-2 and 8422-3 ionomers have a higher tensile yield, lower elongation, slightly higher Shore D hardness and much higher flexural modulus. Surlyn® 8920 contains 15 weight percent methacrylic acid and is 59% neutralized with sodium.

In addition, Surlyn® SEP-503-1 (zinc cation) and Surlyn® SEP-503-2 (magnesium cation) are high acid zinc and magnesium versions of the Surlyn® AD 8422 high acid ionomers. As shown in Table 2, when compared to the Surlyn® AD 8422 high acid ionomers, the Surlyn SEP-503-1 and SEP-503-2 ionomers can be defined as follows:

TABLE 2

Other Surlyn ® Ionomers

| Surlyn ® Ionomer | Ion | Melt Index | Neutralization % |
|---|---|---|---|
| AD 8422-3 | Na | 1.0 | 45 |
| SEP 503-1 | Zn | 0.8 | 38 |
| SEP 503-2 | Mg | 1.8 | 43 |

Furthermore, Surlyn® 8162 is a zinc cation ionomer resin containing approximately 20% by weight (i.e. 18.5–21.5% weight) methacrylic acid copolymer that has been 30–70% neutralized. Surlyn® 8162 is currently commercially available from DuPont.

Examples of the high acid acrylic acid based ionomers suitable for use in the present invention also include the Escor® or Iotek high acid ethylene acrylic acid ionomers produced by Exxon. In this regard, Escor® or Iotek 959 is a sodium ion neutralized ethylene-acrylic neutralized ethylene-acrylic acid copolymer. According to Exxon, Ioteks 959 and 960 contain from about 19.0 to about 21.0% by weight acrylic acid with approximately 30 to about 70 percent of the acid groups neutralized with sodium and zinc ions, respectively. As set forth in Table 3, the physical properties of these high acid acrylic acid based ionomers are as follows:

TABLE 3

General Properties of Escor ® Ionomers

| PROPERTY | ESCOR ® (IOTEK) 959 | ESCOR ® (IOTEK) 960 |
|---|---|---|
| Melt Index, g/10 min | 2.0 | 1.8 |
| Cation | Sodium | Zinc |
| Melting Point, ° F. | 172 | 174 |
| Vicat Softening Point, ° F. | 130 | 131 |
| Tensile @ Break, psi | 4600 | 3500 |
| Elongation @ Break, % | 325 | 430 |
| Hardness, Shore D | 66 | 57 |
| Flexural Modulus, psi | 66,000 | 27,000 |

Furthermore, as a result of the development by the inventors of a number of new high acid ionomers neutralized to various extents by several different types of metal cations, such as by manganese, lithium, potassium, calcium and nickel cations, several new high acid ionomers and/or high acid ionomer blends besides sodium, zinc and magnesium high acid ionomers or ionomer blends are now available for golf ball cover production. It has been found that these new cation neutralized high acid ionomer blends produce inner cover layer compositions exhibiting enhanced hardness and resilience due to synergies which occur during processing. Consequently, the metal cation neutralized high acid ionomer resins recently produced can be blended to produce substantially harder inner cover layers for multi-layered golf balls having higher C.O.R.'s than those produced by the low acid ionomer inner cover compositions presently commercially available.

More particularly, several new metal cation neutralized high acid ionomer resins have been produced by the inventors by neutralizing, to various extents, high acid copolymers of an alpha-olefin and an alpha, beta-unsaturated carboxylic acid with a wide variety of different metal cation salts. This discovery is the subject matter of U.S. Pat. No. 5,688,869, incorporated herein by reference. It has been found that numerous new metal cation neutralized high acid ionomer resins can be obtained by reacting a high acid copolymer (i.e. a copolymer containing greater than 16% by weight acid, preferably from about 17 to about 25 weight percent acid, and more preferably about 20 weight percent acid), with a metal cation salt capable of ionizing or neutralizing the copolymer to the extent desired (i.e. from about 10% to 90%).

The base copolymer is made up of greater than 16% by weight of an alpha, beta-unsaturated carboxylic acid and an alpha-olefin. Optionally, a softening comonomer can be included in the copolymer. Generally, the alpha-olefin has from 2 to 10 carbon atoms and is preferably ethylene, and the unsaturated carboxylic acid is a carboxylic acid having from about 3 to 8 carbons. Examples of such acids include acrylic acid, methacrylic acid, ethacrylic acid, chloroacrylic acid, crotonic acid, maleic acid, fumaric acid, and itaconic acid, with acrylic acid being preferred.

The softening comonomer that can be optionally included in the invention may be selected from the group consisting of vinyl esters of aliphatic carboxylic acids wherein the acids have 2 to 10 carbon atoms, vinyl ethers wherein the alkyl groups contain 1 to 10 carbon atoms, and alkyl acrylates or methacrylates wherein the alkyl group contain 1 to 10 carbon atoms. Suitable softening comonomers include vinyl acetate, methyl acrylate, methyl methacrylate, ethyl acrylate, ethyl methacrylate, butyl acrylate, butyl methacrylate, or the like.

Consequently, examples of a number of copolymers suitable for use to produce the high acid ionomers included in the present invention include, but are not limited to, high acid embodiments of an ethylene/acrylic acid copolymer, an ethylene/methacrylic acid copolymer, an ethylene/itaconic acid copolymer, an ethylene/maleic acid copolymer, an ethylene/methacrylic acid/vinyl acetate copolymer, an ethylene/acrylic acid/vinyl alcohol copolymer, etc. The base copolymer broadly contains greater than 16% by weight unsaturated carboxylic acid, from about 30 to about 83% by weight ethylene and from 0 to about 40% by weight of a softening comonomer. Preferably, the copolymer contains about 20% by weight unsaturated carboxylic acid and about 80% by weight ethylene. Most preferably, the copolymer contains about 20% acrylic acid with the remainder being ethylene.

Along these lines, examples of the preferred high acid base copolymers which fulfill the criteria set forth above, are a series of ethylene-acrylic copolymers which are commercially available from The Dow Chemical Company, Midland, Mich., under the "Primacor" designation. These high acid base copolymers exhibit the typical properties set forth below in Table 4.

TABLE 4

Typical Properties of Primacor Ethylene-Acrylic Acid Copolymers

| GRADE | PERCENT ACID | DENSITY, g/cc | MELT INDEX, g/10 min | TENSILE YD. ST (psi) | FLEXURAL MODULUS (psi) | VICAT SOFT PT (° C.) | SHORE D HARDNESS |
|---|---|---|---|---|---|---|---|
| ASTM | | D-792 | D-1238 | D-638 | D-790 | D-1525 | D-2240 |
| 5980 | 20.0 | 0.958 | 300.0 | — | 4800 | 43 | 50 |
| 5990 | 20.0 | 0.955 | 1300.0 | 650 | 2600 | 40 | 42 |
| 5981 | 20.0 | 0.960 | 300.0 | 900 | 3200 | 46 | 48 |
| 5983 | 20.0 | 0.958 | 500.0 | 850 | 3100 | 44 | 45 |
| 5991 | 20.0 | 0.953 | 2600.0 | 635 | 2600 | 38 | 40 |

[1]The Melt Index values are obtained according to ASTM D-1238, at 190° C.

Due to the high molecular weight of the Primacor 5981 grade of the ethylene-acrylic acid copolymer, this copolymer is the more preferred grade utilized in the invention.

The metal cation salts utilized in the invention are those salts which provide the metal cations capable of neutralizing, to various extents, the carboxylic acid groups of the high acid copolymer. These include acetate, oxide or hydroxide salts of lithium, calcium, zinc, sodium, potassium, nickel, magnesium, and manganese.

Examples of such lithium ion sources are lithium hydroxide monohydrate, lithium hydroxide, lithium oxide and lithium acetate. Sources for the calcium ion include calcium hydroxide, calcium acetate and calcium oxide. Suitable zinc ion sources are zinc acetate dihydrate and zinc acetate, a blend of zinc oxide and acetic acid. Examples of sodium ion sources are sodium hydroxide and sodium acetate. Sources for the potassium ion include potassium hydroxide and potassium acetate. Suitable nickel ion sources are nickel acetate, nickel oxide and nickel hydroxide. Sources of magnesium include magnesium oxide, magnesium hydroxide, magnesium acetate. Sources of manganese include manganese acetate and manganese oxide.

The new metal cation neutralized high acid ionomer resins are produced by reacting the high acid base copolymer with various amounts of the metal cation salts above the crystalline melting point of the copolymer, such as at a temperature from about 200° F. to about 500° F., preferably from about 250° F. to about 350° F. under high shear conditions at a pressure of from about 10 psi to 10,000 psi. Other well known blending techniques may also be used. The amount of metal cation salt utilized to produce the new metal cation neutralized high acid based ionomer resins is the quantity which provides a sufficient amount of the metal cations to neutralize the desired percentage of the carboxylic acid groups in the high acid copolymer. The extent of neutralization is generally from about 10 to about 90%.

As indicated below in Table 5 and more specifically in the Examples in U.S. Pat. No. 5,688,869 a number of new types of metal cation neutralized high acid ionomers can be obtained from the above indicated process. These include new high acid ionomer resins neutralized to various extents with manganese, lithium, potassium, calcium and nickel cations. In addition, when a high acid ethylene/acrylic acid copolymer is utilized as the base copolymer component of the invention and this component is subsequently neutralized to various extents with the metal cation salts producing acrylic acid based high acid ionomer resins neutralized with cations such as sodium, potassium, lithium, zinc, magnesium, manganese, calcium and nickel, several new cation neutralized acrylic acid based high acid ionomer resins are produced.

TABLE 5

| Formulation No. | Wt-% Cation Salt | Wt-% Neutralization | Melt Index | C.O.R. | Shore D Hardness |
|---|---|---|---|---|---|
| 1(NaOH) | 6.98 | 67.5 | 0.9 | .804 | |
| 2(NaOH) | 5.66 | 54.0 | 2.4 | .808 | 73 |
| 3(NaOH) | 3.84 | 35.9 | 12.2 | .812 | 69 |
| 4(NaOH) | 2.91 | 27.0 | 17.5 | .812 | (brittle) |
| 5(MnAc) | 19.6 | 71.7 | 7.5 | .809 | 73 |
| 6(MnAc) | 23.1 | 88.3 | 3.5 | .814 | 77 |
| 7(MnAc) | 15.3 | 53.0 | 7.5 | .810 | 72 |
| 8(MnAc) | 26.5 | 106 | 0.7 | .813 | (brittle) |
| 9(LiOH) | 4.54 | 71.3 | 0.6 | .810 | 74 |

TABLE 5-continued

| | | | | | |
|---|---|---|---|---|---|
| 10(LiOH) | 3.38 | 52.5 | 4.2 | .818 | 72 |
| 11(LiOH) | 2.34 | 35.9 | 8.6 | .815 | 72 |
| 12(KOH) | 5.30 | 36.0 | 9.3 | Broke | 70 |
| 13(KOH) | 8.26 | 57.9 | 7.18 | .804 | 70 |
| 14(KOH) | 0.7 | 77.0 | 4.3 | .801 | 67 |
| 15(ZnAc) | 7.9 | 71.5 | 0.2 | .806 | 71 |
| 16(ZnAc) | 3.9 | 53.0 | 0.9 | .797 | 69 |
| 17(ZnAc) | 9.91 | 36.1 | 3.4 | .793 | 67 |
| 18(MgAc) | 7.4 | 70.7 | 2.8 | .814 | 74 |
| 19(MgAc) | 20.6 | 87.1 | 1.5 | .815 | 76 |
| 20(MgAc) | 13.8 | 53.8 | 4.1 | .814 | 74 |
| 21(CaAc) | 3.2 | 69.2 | 1.1 | .813 | 74 |
| 22(CaAc) | 7.12 | 34.9 | 10.1 | .808 | 70 |

Controls: 50/50 Blend of Ioteks 8000/7030 C.O.R. = .810165 Shore D Hardness
DuPont High Acid Surlyn ® 8422 (Na) C.O.R. = .811/70 Shore D Hardness
DuPont High Acid Surlyn ® 8162 (Zn) C.O.R. = .807/65 Shore D Hardness
Exxon High Acid Iotek EX-960 (Zn) C.O.R. = .796/65 Shore D Hardness

| Formulation No. | Wt-% Cation Salt | Wt-% Neutralization | Melt Index | C.O.R. |
|---|---|---|---|---|
| 23(MgO) | 2.91 | 53.5 | 2.5 | .813 |
| 24(MgO) | 3.85 | 71.5 | 2.8 | .808 |
| 25(MgO) | 4.76 | 89.3 | 1.1 | .809 |
| 26(MgO) | 1.96 | 35.7 | 7.5 | .815 |

Control for Formulations 23–26 is 50/50 Iotek 8000/703D, C.O.R. = .814, Formulation 26 C.O.R. was normalized to that control accordingly

| Formulation No. | Wt-% Cation Salt | Wt-% Neutralization | Melt Index | C.O.R. | Shore D Hardness |
|---|---|---|---|---|---|
| 27(NiAc) | 13.04 | 61.1 | 0.2 | .802 | 71 |
| 28(NiAc) | 10.71 | 48.9 | 0.5 | .799 | 72 |
| 29(NiAc) | 8.26 | 36.7 | 1.8 | .796 | 69 |
| 30(NiAc) | 5.66 | 24.4 | 7.5 | .786 | 64 |

Control for Formulation Nos. 27–30 is 50/50 Iotek 8000/7030, C.O.R. = .807

When compared to low acid versions of similar cation neutralized ionomer resins, the new metal cation neutralized high acid ionomer resins exhibit enhanced hardness, modulus and resilience characteristics. These are properties that are particularly desirable in a number of thermoplastic fields, including the field of golf ball manufacturing.

When utilized in the construction of the inner layer of a multi-layered golf ball, it has been found that the new acrylic acid based high acid ionomers extend the range of hardness beyond that previously obtainable while maintaining the beneficial properties (i.e. durability, click, feel, etc.) of the softer low acid ionomer covered balls, such as balls produced utilizing the low acid ionomers disclosed in U.S. Pat. Nos. 4,884,814 and 4,911,451.

Moreover, as a result of the development of a number of new acrylic acid based high acid ionomer resins neutralized to various extents by several different types of metal cations, such as manganese, lithium, potassium, calcium and nickel cations, several new ionomers or ionomer blends are now available for production of an inner cover layer of a multi-layered golf ball. By using these high acid ionomer resins, harder, stiffer inner cover layers having higher C.O.R.s, and thus longer distance, can be obtained.

More preferably, it has been found that when two or more of the above-indicated high acid ionomers, particularly blends of sodium and zinc high acid ionomers, are processed to produce the covers of multi-layered golf balls, (i.e., the inner cover layer herein) the resulting golf balls will travel further than previously known multi-layered golf balls produced with low acid ionomer resin covers due to the balls' enhanced coefficient of restitution values.

For example, the multi-layer golf ball taught in 4,650,193 does not incorporate a high acid ionomeric resin in the inner cover layer. The coefficient of restitution of the golf ball having an inner layer taught by the '193 patent (i.e., inner layer composition "D" in the Examples) is substantially lower than the coefficient of restitution of the remaining compositions. In addition, the multi-layered ball disclosed in the '193 patent suffers substantially in durability in comparison with the present invention.

Outer Cover Layer

With respect to the outer layer 16 of the preferred multi-layered cover, the outer cover layer is comparatively softer than the high acid ionomer based inner layer. The softness provides for the feel and playability characteristics typically associated with balata or balata-blend balls. The outer layer or ply is comprised of a relatively soft, low modulus (about 1,000 psi to about 10,000 psi) and low acid (less than 16 weight percent acid) ionomer, ionomer blend or a non-ionomeric thermoplastic elastomer such as, but not limited to, a polyurethane, a polyester elastomer such as that marketed by DuPont under the trademark Hytrel®, or a polyester amide such as that marketed by Elf Atochem S.A. under the trademark Pebax®. The outer layer is fairly thin (i.e. from about 0.010 to about 0.050 in thickness, more desirably 0.03 inches in thickness for a 1.680 inch ball), but thick enough to achieve desired playability characteristics while minimizing expense.

Preferably, the outer layer includes a blend of hard and soft (low acid) ionomer resins such as those described in U.S. Pat. Nos. 4,884,814 and 5,120,791, both incorporated herein by reference. Specifically, a desirable material for use in molding the outer layer comprises a blend of a high modulus (hard) ionomer with a low modulus (soft) ionomer to form a base ionomer mixture. A high modulus ionomer herein is one which measures from about 15,000 to about 70,000 psi as measured in accordance with ASTM method D-790. The hardness may be defined as at least 50 on the Shore D scale as measured in accordance with ASTM method D-2240.

A low modulus ionomer suitable for use in the outer layer blend has a flexural modulus measuring from about 1,000 to about 10,000 psi, with a hardness of about 20 to about 40 on the Shore D scale.

The hard ionomer resins utilized to produce the outer cover layer composition hard/soft blends include ionic copolymers which are the sodium, zinc, magnesium or lithium salts of the reaction product of an olefin having from 2 to 8 carbon atoms and an unsaturated monocarboxylic acid having from 3 to 8 carbon atoms. The carboxylic acid groups of the copolymer may be totally or partially (i.e. approximately 15–75 percent) neutralized.

The hard ionomeric resins are likely copolymers of ethylene and either acrylic and/or methacrylic acid, with copolymers of ethylene and acrylic acid being the most preferred. Two or more types of hard ionomeric resins may be blended into the outer cover layer compositions in order to produce the desired properties of the resulting golf balls.

As discussed earlier herein, the hard ionomeric resins introduced under the designation Escor® and sold under the designation "Iotek" are somewhat similar to the hard ionomeric resins sold under the Surlyn® trademark. However, since the "Iotek" ionomeric resins are sodium or zinc salts of poly(ethylene-acrylic acid) and the Surlyn® resins are zinc or sodium salts of poly(ethylene-methacrylic acid) some distinct differences in properties exist. As more specifically indicated in the data set forth below, the hard "Iotek" resins (i.e., the acrylic acid based hard ionomer resins) are the more preferred hard resins for use in formulating the outer layer blends for use in the present invention. In addition, various blends of "Iotek" and Surlyn® hard ionomeric resins, as well as other available ionomeric resins, may be utilized in the present invention in a similar manner.

Examples of commercially available hard ionomeric resins which may be used in the present invention in formulating the outer cover blends include the hard sodium ionic copolymer sold under the trademark Surlyn®8940 and the hard zinc ionic copolymer sold under the trademark Surlyn®9910. Surlyn®8940 is a copolymer of ethylene with methacrylic acid and about 15 weight percent acid which is about 29 percent neutralized with sodium ions. This resin has an average melt flow index of about 2.8. Surlyn®9910 is a copolymer of ethylene and methacrylic acid with about 15 weight percent acid which is about 58 percent neutralized with zinc ions. The average melt flow index of Surlyn®9910 is about 0.7. The typical properties of Surlyn®9910 and 8940 are set forth below in Table 6:

TABLE 6

Typical Properties of Commercially Available Hard
Surlyn ® Resins Suitable for Use in the Outer Layer Blends of
the Present Invention

|  | ASTM D | 8940 | 9910 | 8920 | 8528 | 9910 | 9130 |
| --- | --- | --- | --- | --- | --- | --- | --- |
| Cation Type |  | Sodium | Zinc | Sodium | Sodium | Zinc | Zinc |
| Melt flow index, gms/10 min. | D-1238 | 2.8 | 0.7 | 0.9 | 1.3 | 14.0 | 1.6 |
| Specific Gravity, g/cm³ | D-792 | 0.95 | 0.97 | 0.95 | 0.94 | 0.95 | 0.95 |
| Hardness, Shore D | D-2240 | 66 | 64 | 66 | 60 | 62 | 63 |
| Tensile Strength, (kpsi), MPa | D-638 | (4.8) 33.1 | (3.6) 24.8 | (5.4) 37.2 | (4.2) 29.0 | (3.2) 22.0 | (4.1) 28.0 |
| Elongation, % | D-638 | 470 | 290 | 350 | 450 | 460 | 460 |
| Flexural Modulus, | D-790 | (51) | (48) | (55) | (32) | (28) | (30) |

TABLE 6-continued

Typical Properties of Commercially Available Hard Surlyn ® Resins Suitable for Use in the Outer Layer Blends of the Present Invention

|  | ASTM D | 8940 | 9910 | 8920 | 8528 | 9910 | 9130 |
|---|---|---|---|---|---|---|---|
| (kpsi) MPa |  | 350 | 330 | 380 | 220 | 190 | 210 |
| Tensile Impact (23° C.) KJ/m$_2$ (ft.-lbs./in$^2$) | D-1822S | 1020 (485) | 1020 (485) | 865 (410) | 1160 (550) | 760 (360) | 1240 (590) |
| Vicat Temperature, ° C. | D-1525 | 63 | 62 | 58 | 73 | 61 | 73 |

Examples of the more pertinent acrylic acid based hard ionomer resin suitable for use in the present outer cover composition sold under the "Iotek" tradename by the Exxon Corporation include Iotek 4000, Iotek 4010, Iotek 8000, Iotek 8020 and Iotek 8030. The typical properties of these and other Iotek hard ionomers suited for use in formulating the outer layer cover composition are set forth below in Table 7:

TABLE 7

Typical Properties of Iotek Ionomers

| Resin Properties | ASTM Method | Units | 4000 | 4010 | 8000 | 8020 | 8030 |
|---|---|---|---|---|---|---|---|
| Cation type |  |  | zinc | zinc | sodium | sodium | sodium |
| Melt index | D-1238 | g/10 min. | 2.5 | 1.5 | 0.8 | 1.6 | 2.8 |
| Density | D-1505 | kg/m$^3$ | 963 | 963 | 954 | 960 | 960 |
| Melting Point | D-3417 | ° C. | 90 | 90 | 90 | 87.5 | 87.5 |
| Crystallization Point | D-3417 | ° C. | 62 | 64 | 56 | 53 | 55 |
| Vicat Softening Point | D-1525 | ° C. | 62 | 63 | 61 | 64 | 67 |
| % Weight Acrylic Acid |  |  | 16 |  | 11 |  |  |
| % of Acid Groups cation neutralized |  |  | 30 |  | 40 |  |  |
| Plaque Properties | ASTM Method | Units | 4000 | 4010 | 8000 | 8020 | 8030 |
| (3 mm thick, compression molded) |  |  |  |  |  |  |  |
| Tensile at break | D-638 | MPa | 24 | 26 | 36 | 31.5 | 28 |
| Yield point | D-638 | MPa | none | none | 21 | 21 | 23 |
| Elongation at break | D-638 | % | 395 | 420 | 350 | 410 | 395 |
| 1% Secant modulus | D-638 | MPa | 160 | 160 | 300 | 350 | 390 |
| Shore Hardness D | D-2240 | — | 55 | 55 | 61 | 58 | 59 |
| Film Properties (50 micron film 2.2:1 Blow-up ratio) |  |  | 4000 | 4010 | 8000 | 8020 | 8030 |
| Tensile at Break MD | D-882 | MPa | 41 | 39 | 42 | 52 | 47.4 |
| TD | D-882 | MPa | 37 | 38 | 38 | 38 | 40.5 |
| Yield point MD | D-882 | MPa | 15 | 17 | 17 | 23 | 21.6 |
| TD | D-882 | MPa | 14 | 15 | 15 | 21 | 20.7 |
| Elongation at Break |  |  |  |  |  |  |  |
| MD | D-882 | % | 310 | 270 | 260 | 295 | 305 |
| TD | D-882 | % | 360 | 340 | 280 | 340 | 345 |
| 1% Secant modulus MD | D-882 | MPa | 210 | 215 | 390 | 380 | 380 |
| TD | D-882 | MPa | 200 | 225 | 380 | 350 | 345 |
| Dart Drop Impact | D-1709 | g/micron | 12.4 | 12.5 | 20.3 |  |  |
| Resin Properties | ASTM Method | Units | 7010 |  | 7020 |  | 7030 |
| Cation type |  |  | zinc |  | zinc |  | zinc |
| Melt Index | D-1238 | g/10 min. | 0.8 |  | 1.5 |  | 2.5 |
| Density | D-1505 | kg/m$^3$ | 960 |  | 960 |  | 960 |
| Melting Point | D-3417 | ° C. | 90 |  | 90 |  | 90 |
| Crystallization Point | D-3417 | ° C. | — |  | — |  | — |
| Vicat Softening Point | D-1525 | ° C. | 60 |  | 63 |  | 62.5 |
| % Weight Acrylic Acid |  |  | — |  | — |  | — |
| % of Acid Groups Cation Neutralized |  |  |  |  |  |  |  |
| (3 mm thick, |  |  |  |  |  |  |  |

TABLE 7-continued

Typical Properties of Iotek Ionomers

| compression molded) | | | | | |
|---|---|---|---|---|---|
| Tensile at break | D-638 | MPa | 38 | 38 | 38 |
| Yield Point | D-638 | MPa | none | none | none |
| Elongation at break | D-638 | % | 500 | 420 | 395 |
| 1% Secant modulus | D-638 | MPa | — | — | — |
| Shore Hardness D | D-2240 | — | 57 | 55 | 55 |

Comparatively, soft ionomers are used in formulating the hard/soft blends of the outer cover composition. These ionomers include acrylic acid based soft ionomers. They are generally characterized as comprising sodium or zinc salts of a terpolymer of an olefin having from about 2 to 8 carbon atoms, acrylic acid, and an unsaturated monomer of the acrylate ester class having from 1 to 21 carbon atoms. The soft ionomer is preferably a zinc based ionomer made from an acrylic acid base polymer in an unsaturated monomer of the acrylate ester class. The soft (low modulus) ionomers have a hardness from about 20 to about 40 as measured on the Shore D scale and a flexural modulus from about 1,000 to about 10,000, as measured in accordance with ASTM method D-790.

Certain ethylene-acrylic acid based soft ionomer resins developed by the Exxon Corporation under the designation "Iotek 7520" (referred to experimentally by differences in neutralization and melt indexes as LDX 195, LDX 196, LDX 218 and LDX 219) may be combined with known hard ionomers such as those indicated above to produce the outer cover. The combination produces higher C.O.R.s at equal or softer hardness, higher melt flow (which corresponds to improved, more efficient molding, i.e., fewer rejects) as well as significant cost savings versus the outer layer of multi-layer balls produced by other known hard-soft ionomer blends as a result of the lower overall raw materials costs and improved yields.

While the exact chemical composition of the resins to be sold by Exxon under the designation Iotek 7520 is considered by Exxon to be confidential and proprietary information, Exxon's experimental product data sheet lists the following physical properties of the ethylene acrylic acid zinc ionomer developed by Exxon:

TABLE 8

Physical Properties of Iotek 7520

| Property | ASTM Method | Units | Typical Value |
|---|---|---|---|
| Melt Index | D-1238 | g/10 min. | 2 |
| Density | D-1505 | kg/m³ | 0.962 |
| Cation | | | Zinc |
| Melting Point | D-3417 | ° C. | 66 |
| Crystallization Point | D-3417 | ° C. | 49 |
| Vicat Softening Point | D-1525 | ° C. | 42 |
| Plaque Properties (2 mm thick Compression Molded Plaques) | | | |
| Tensile at Break | D-638 | MPa | 10 |
| Yield Point | D-638 | MPa | None |
| Elongation at Break | D-638 | % | 760 |
| 1% Secant Modulus | D-638 | MPa | 22 |
| Shore D Hardness | D-2240 | | 32 |
| Flexural Modulus | D-790 | MPa | 26 |

TABLE 8-continued

Physical Properties of Iotek 7520

| Property | ASTM Method | Units | Typical Value |
|---|---|---|---|
| Zwick Rebound | ISO 4862 | % | 52 |
| De Mattia Flex Resistance | D-430 | Cycles | >5000 |

In addition, test data collected by the inventors indicates that Iotek 7520 resins have Shore D hardnesses of about 32 to 36 (per ASTM D-2240), melt flow indexes of 3±0.5 g/10 min (at 190° C. per ASTM D-1288), and a flexural modulus of about 2500–3500 psi (per ASTM D-790). Furthermore, testing by an independent testing laboratory by pyrolysis mass spectrometry indicates that Iotek 7520 resins are generally zinc salts of a terpolymer of ethylene, acrylic acid, and methyl acrylate.

Furthermore, the inventors have found that a newly developed grade of an acrylic acid based soft ionomer available from the Exxon Corporation under the designation Iotek 7510, is also effective, when combined with the hard ionomers indicated above in producing golf ball covers exhibiting higher C.O.R. values at equal or softer hardness than those produced by known hard-soft ionomer blends. In this regard, Iotek 7510 has the advantages (i.e. improved flow, higher C.O.R. values at equal hardness, increased clarity, etc.) produced by the Iotek 7520 resin when compared to the methacrylic acid base soft ionomers known in the art (such as the Surlyn 8625 and the Surlyn 8629 combinations disclosed in U.S. Pat. No. 4,884,814).

In addition, Iotek 7510, when compared to Iotek 7520, produces slightly higher C.O.R. values at equal softness/hardness due to the Iotek 7510's higher hardness and neutralization. Similarly, Iotek 7510 produces better release properties (from the mold cavities) due to its slightly higher stiffness and lower flow rate than Iotek 7520. This is important in production where the soft covered balls tend to have lower yields caused by sticking in the molds and subsequent punched pin marks from the knockouts.

According to Exxon, Iotek 7510 is of similar chemical composition as Iotek 7520 (i.e. a zinc salt of a terpoloymer of ethylene, acrylic acid, and methyl acrylate) but is more highly neutralized. Based upon FTIR analysis, Iotek 7520 is estimated to be about 30–40 wt.-% neutralized and Iotek 7510 is estimated to be about 40–60 wt.-% neutralized. The typical properties of Iotek 7510 in comparison of those of Iotek 7520 are set forth below in Table 9:

TABLE 9

Physical Properties of Iotek 7510 in Comparison to Iotek 7520

|  | IOTEK 7520 | IOTEK 7510 |
|---|---|---|
| MI, g/10 min | 2.0 | 0.8 |
| Density, g/cc | 0.96 | 0.97 |
| Melting Point, ° F. | 151 | 149 |
| Vicat Softening Point, ° F. | 108 | 109 |
| Flex Modulus, psi | 3800 | 5300 |
| Tensile Strength, psi | 1450 | 1750 |
| Elongation, % | 760 | 690 |
| Hardness, Shore D | 32 | 35 |

It has been determined that when hard/soft ionomer blends are used for the outer cover layer, good results are achieved when the relative combination is in a range of about 90 to about 10 percent hard ionomer and about 10 to about 90 percent soft ionomer. The results are improved by adjusting the range to about 75 to 25 percent hard ionomer and 25 to 75 percent soft ionomer. Even better results are noted at relative ranges of about 60 to 90 percent hard ionomer resin and about 40 to 60 percent soft ionomer resin. Specific formulations which may be used in the cover composition are included in the examples set forth in U.S. Pat. Nos. 5,120,791 and 4,884,814. The present invention is in no way limited to those examples.

Moreover, in alternative embodiments, the outer cover layer formulation may also comprise a soft, low modulus non-ionomeric thermoplastic elastomer including a polyester polyurethane such as B. F. Goodrich Company's Estane® polyester polyurethane X-4517. According to B.F.Goodrich, Estane® X-4517 has the following properties as set forth below in Table 10:

TABLE 10

Properties of Estane ® X-4517

| Tensile | 1430 |
|---|---|
| 100% | 815 |
| 200% | 1024 |
| 300% | 1193 |
| Elongation | 641 |
| Youngs Modulus | 1826 |
| Hardness A/D | 88/39 |
| Bayshore Rebound | 59 |
| Solubility in Water | Insoluble |
| Melt processing temperature | >350° F. (>177° C.) |
| Specific Gravity (H$_2$O = 1) | 1.1–1.3 |

Other soft, relatively low modulus non-ionomeric thermoplastic elastomers may also be utilized to produce the outer cover layer as long as the non-ionomeric thermoplastic elastomers produce the playability and durability characteristics desired without adversely effecting the enhanced travel distance characteristic produced by the high acid ionomer resin composition. These include, but are not limited to thermoplastic polyurethanes such as: Texin thermoplastic polyurethanes from Mobay Chemical Co. and the Pellethane thermoplastic polyurethanes from Dow Chemical Co.; Ionomer/rubber blends such as those in Spalding U.S. Pat. Nos. 4,986,545; 5,098,105 and 5,187,013; and, Hytrel polyester elastomers from DuPont and pebax polyesteramides from Elf Atochem S.A.

Silicone Interior Layers and/or Core

The present invention golf ball as previously noted, comprises one or more interior layers comprising one or more silicone compositions. The present invention golf ball may also, in addition to these silicone interior layers, comprise a core or core layer(s) comprising one or more silicone materials. The terms "silicone composition" and "silicone material" as used herein are interchangeable for purposes of this patent and comprise silicone polymers, silicone fluids, silicone elastomers, and silicone resins, each of which are described in detail below. It will be understood that these various silicone materials are distinguishable from silica, as is used as a filler agent, as described in U.S. Pat. Nos. 5,387,637; 3,756,607; and 2,764,572, all of which are herein incorporated by reference.

The term silicone as referred to herein denotes a synthetic polymer $(R_nSiO_{(4-n)/2})_m$, where n=1–3 and m≧2. A silicone contains a repeating silicon-oxygen backbone and has organic groups R attached to a significant proportion of the silicon atoms by silicon-carbon bonds. In commercially available silicones, most R groups are methyl, longer alkyl, fluoroalkyl, phenyl, vinyl, and a few other groups are substituted for specific purposes. Some of the R groups can also be hydrogen, chlorine, alkoxy, acyloxy, or alkylamino, etc. These polymers can be combined with fillers, additives, and solvents to result in products generally termed as silicones.

Silicones have an unusual array of properties. Chief among these are thermal and oxidative stability and physical properties that are minimally affected by temperature. Other important characteristics include a high degree of chemical inertness, and resistance to weathering. These features are such that silicone materials are well suited for incorporation into golf balls in accordance with the present invention. The molecular structure of suitable silicones can vary considerably to include linear, branched, and cross-linked structures.

Like carbon, silicon has the capability of forming covalent compounds. Silicon hyrides (silanes) up to $Si_6H_{14}$ are known. The Si—Si chain becomes thermally unstable at about this length, however, so that polymeric silanes are unknown. The siloxane link:

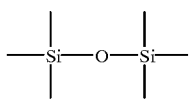

is more stable, and is the one predominantly found in commercial silicone polymers. Unlike carbon, silicon does not form double or triple bonds. Thus silicone polymers are usually formed only by condensation-type reactions.

Silicone polymers are made from organosilicon intermediates prepared in various ways from elemental silicon, which is typically produced by reducing quartz in an electric furnace.

The intermediate "monomers" of silicone polymers are compounds of the type $S_iR_nX_{4-n}$ where R is an alkyl or aryl group and X is a group which can be hydrolyzed to —SiOH, such as chlorine or alkoxy. The intermediates are generally made by a direct synthesis in which the R and X groups are attached simultaneously to the silicon by a high-temperature reaction of a halide with silicon in the presence of a metal catalyst. The chief reaction is, for example,

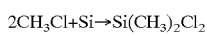

but a number of side reactions may occur.

Silicone polymers are typically produced by intermolecular condensation of silanols, which are formed from the halide or alkoxy intermediates by hydrolysis:

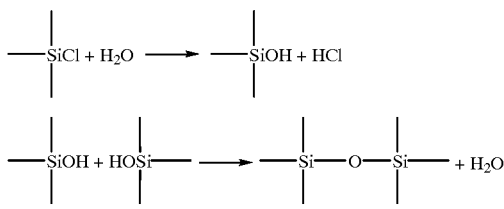

The desired siloxane structure is obtained by using silanols of different functionality, the alkyl R groups in the intermediate being unreactive.

The three commercially important classes of silicone polymers for use in the preferred embodiment golf balls include silicone homopolymers, silicone random copolymers, and silicone-organic (block) copolymers. Polydimethylsiloxanes (PDMS) constitute by far the largest volume of homopolymers commercially produced:

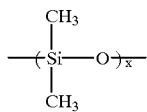

PDMS is usually the principal component of the random copolymers and the principal siloxane component of most silicone-organic copolymers.

The most common silicones are the trimethylsiloxy-terminated polydimethylsiloxanes. These polymers, as well as variations with silanol, vinyl, or hydride end groups, form the building blocks of many silicone fluid-based products and of most cured silicone elastomers. The properties of polydimethylsiloxanes are typically modified by substitution of methyl groups on the silicon atom by hydrogen, alkyl, phenyl, or organofunctional groups.

Silicone fluids are low polymers typically produced by the hydrolysis reaction mentioned above, in which a predetermined mixture of chlorosilanes is fed into water with agitation. In many cases, the cyclic tetramer predominates in the resulting mixture. Many silicone fluids are manufactured commercially, including dimethyl, methylalkyl, and dimethyl-diphenyl copolymers and silicone-polyether copolymers. These compounds are typically used as cooling and dielectric fluids, in polishes and waxes, as release and antifoam agents, and for paper and textile treatment. In view of their relatively low viscosity and fluid nature, these compounds are less preferred for use as the silicone materials in the present invention as compared to silicone polymers, and as described below, silicone elastomers and silicone resins. However, it is contemplated that silicone fluids may be utilized in the present invention golf balls.

Silicone elastomers are high-molecular-weight linear polymers, usually polydimethysiloxanes. Cross-linking silicone polymers of appropriate molecular weight provides elastomeric properties. Fillers increase strength through reinforcement, and extending fillers and additives, eg. antioxidants, adhesion promoters, and pigments, can be utilized to provide specific properties.

Many curing (cross-linking) systems have been developed commercially for silicone elastomers. Different commercially available silicone elastomers are conveniently distinguished by their cure system chemistries and can be categorized by the temperature conditions needed for proper cure. Most compositions are based on polydimethylsiloxanes:

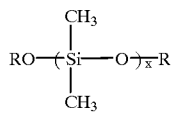

R is determined by the cure system chemistry. It can be hydrogen, an organic radical, or a silyl radical. The silyl radicals can contain single or multiple reactive groups like vinyl or alkoxy. Small amounts of reactive functionality are sometimes present in the chain in (copolymerized) units such as ($CH_2CH$) ($CH_3$)SiO. The value of x varies mainly with the type of product. For room-temperature-vulcanizing RTV products, x is in the 200–1,500 range; for heat-cured products, x is approximately 3,000–11,000.

Silicone elastomers can be cured in several ways:
 a. By free-radical crosslinking with, for example, benzoyl peroxide, through the formation of ethylenic bridges between chains;
 b. By crosslinking of vinyl or allyl groups attached to silicon through reaction with silylhydride groups:

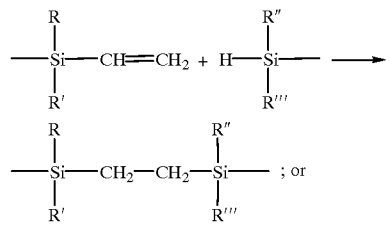

c. By crosslinking linear or slightly branched siloxane chains having reactive end groups such as silanols. In contrast to the above reactions, this yields Si—O—Si crosslinks.

The latter mechanism forms the basis of the curing of room-temperature vulcanizing (RTV) silicone elastomers. These are available as two-part mixtures in which all three essential ingredients for the cure (silanol-terminated polymer, cross-linking agent such as ethyl silicate, and catalyst such as a tin soap) are combined at the time the two components are mixed, and as one-part materials using a hydrolyzable polyfunctional silane or siloxane as crosslinker, activated by atmospheric moisture.

Silicone elastomers are preferably reinforced by a finely divided material such as silica to more readily achieve properties for the silicone material as utilized in the interior layer(s) or core. Specifically, the reinforcing fillers for silicone elastomers may be finely divided silicas made by fume or wet processes. The fume process provides the highest degree of reinforcement. Accordingly, the particle size is small. The particle diameter should be about the length of a fully extended polymer chain, i.e., about 1 $\mu$m, for semireinforcement and about 0.01–0.05 $\mu$m for strong reinforcement. Fine particle size does not necessarily provide good reinforcement because finely divided fillers tend to agglomerate and are hard to disperse. This tendency can be countered by treating the filler to give it an organic or a silicone coating before mixing it with polymer.

Hexamethyldisilazane, [($CH_3$)$_3$Si]$_2$NH, is sometimes used as a coupling agent. Treating the silica particles with hot vapors of low molecular weight cyclic siloxanes reduces agglomeration and prevents premature crepe hardening.

Nonreinforcing fillers, such as iron oxide or titanium dioxide, may be utilized to stabilize or color the resulting silicone material or to decrease the cost per unit volume.

Thus fillers of many different chemical compositions with a broad range of particle sizes and physical properties are suitable for use with silicone elastomers when utilized in the present invention golf balls. The particular filler(s) selected primarily depend upon the desired end use properties of the silicone material in the golf balls. The mechanism of reinforcement has not been unequivocally determined and may indeed vary from one filler or polymer type to another. However, particle size is of prime importance for the strength of the elastomer compound after cure. Effective reinforcement is generally provided by silica particles having a specific gravity of about 2 and a range of about 20–400 m$^2$/g specific surface area.

Nonreinforcing fillers may also be used merely as extenders. The particle size of such fillers ranges from submicrometer to about 10 μm. These fillers may not improve physical properties, but can be incorporated in significant amounts without adversely affecting strength of the resulting silicone material. Manufacture of these extenders does not require the specialized technology necessary for extremely fine particle fillers, but the selected extenders must meet rigorous requirements of thermal stability, low volatile content, and chemical purity.

Silicone elastomers differ in several important ways from most organic elastomers. The most striking difference is the degree to which the strength of the final compound depends on the reinforcement conferred by the incorporation of fillers. Typical unfilled silicone gums, when cross-linked, are weak and soft, with tensile strengths on the order of 0.34 MPa (50 psi). Compounding with suitably reinforcing fillers may increase the tensile strength as much as 50-fold. The selection of the filler is therefore extremely important for applications where strength is required. These differences in polymer-filler interactions and physical property requirements make fillers suitable for silicone elastomers different from those used for natural and synthetic rubber compounding.

The preferred filler types for silicone compounds used in the present invention golf balls include finely divided silicas prepared by vapor-phase hydrolysis or oxidation of chlorosilanes, dehydrated silica gels, precipitated silicas, diatomaceous silicas, and finely ground high assay natural silicas; fumed titania, alumina, and zirconia. Pigment-grade oxides especially ferric oxides, are extensively used as fillers for high temperature compounds in oxidizing environments. The iron oxide stabilizes the polymer against atmospheric oxidation and preserves the elastomeric characteristics, especially resilience and deformability, after exposure to temperatures above 300° C. Carbon blacks have had limited application because of their high content of adsorbed volatiles, which can lead to void formation during cure. Other types of fillers include calcium carbonate, clays, siicates, and aluminates. Fibrous fillers improve tear resistance at the expense of elongation, and hollow glass or plastic microspheres reduce the specific gravity. Fillers and their effects on heat-cured rubber properties are shown in Table 11.

TABLE 11

Fillers Suitable for Silicone Polymers

| Filler | Particle Size | | Reinforcement produced in silicone gums | |
| --- | --- | --- | --- | --- |
| | Mean Diameter, μm | Surface Area, m$^2$/g | Tensile Strength, MPa | Elongation, % |
| Reinforcing | | | | |
| fumed silica | 0.03 | silica | 4.1–6.9 | 200–350 |
| acetylene black | 0.015–0.02 | aerogel | 4.1–12.4 | 200–600 |
| Semireinforcing and nonreinforcing | 0.045 | 110–150 | 4.1–6.2 | 200–350 |
| flux-calcined diatomaceous silica | | 175–200 | | |
| calcined diatomaceous silica | 1.5 | 78–85 | 2.7–5.5 | 75–200 |
| calcined kaolin | 1–5 | | 2.7–5.5 | 75–200 |
| precipitated calcium carbonate | 1–5 | <5 | 2.7–5.5 | 75–200 |
| ground silica | 0.03–0.05 | <5 | 2.7–4.1 | 100–300 |
| ground silica | 5–10 | <5 | 0.7–2.8 | 200–300 |
| ground silica | 1–10 | 32 | 0.7–2.8 | 200–300 |
| zinc oxide | 5 | | 0.7–2.8 | 200–300 |
| iron oxide | 0.3 | | 1.4–3.5 | 100–300 |
| zirconium silicate | <1 | | 1.4–3.5 | 100–300 |
| titanium dioxide | | 3.0 | 2.8–4.1 | 100–300 |
| | 0.3 | | 1.4–3.5 | 300–400 |

Some silica or other oxide-filled silicone elastomers tend to "structure," i.e., to form an elastic mass before cure, impeding normal processing operations such as molding and extrusion. Intensive working of the compound with a rubber mill or other mixer may be necessary to restore plasticity. To minimize this tendency, plasticizers and process aids may be incorporated into the compounds. The most commonly used additives are monomeric or oligomeric organosilicon compounds. High surface silica filler is treated with a silicon derivative to minimize the buildup of structure. The structuring tendency is associated with hydrogen bonding between the siloxane polymers and silanol groups on the filler surface. The extent of hydrogen bonding is a function of the concentration of surface silanol and varies with the type and method of preparation of the filler. Surface silanol concentration can be related to the total surface area as determined by absorption methods. Sufficient treating agent can be added to react completely with or be hydrogen bonded to the silanol groups present and yield a nonstructuring rubber compound. In an early method, the filler is treated with chlorosilanes or other reactive silanes, and the HCl or other reaction products are removed by purging the filler mass with an inert gas. Cyclic siloxane oligomers may be used to treat filler for silicone elastomers.

The extremely high surface silicas used as fillers present the same storage and handling problems as conventional fluffy carbon blacks. Typical bulk densities for fumed silicas typically range from about 32 to about 80 kg/M$^3$. They can be increased to 160–240 kg/m$^3$ by mechanical compaction and deaeration.

Oligomers of polydimethylsiloxane can be polymerized in the presence of fillers. Uncatalyzed base compounds for both RTV and heat-curing elastomers can be made in this way. However, optimal properties still depend on conventional compounding.

Related to silicone elastomers, room temperature vulcanizing (RTV) silicone elastomers are often available as uncured rubbers with liquid or paste like consistencies. They are based on polymers of intermediate molecular weights and viscosities, e.g., 100–1,000,000 mm$^2$/s at 25° C. Curing is based on chemical reactions that increase molecular weights and provide cross-linking. Catalysts may be utilized to ensure cure control. The RTV silicone rubbers are typically available in two modifications. The cure reactions of one-component products are triggered by exposure to atmospheric moisture. Those of two-component products are triggered by mixing the two components, one of which consists of or contains the catalyst.

Commercially available one-component RTV rubbers are typically made by mixing polymers, fillers, additives, curing agents, and catalysts. The mixture is packaged to protect it from moisture, which may trigger cure. The time required for cure depends on the curing system, temperature, humidity, and thickness of the silicone layer or core component. Under typical ambient conditions the surface can be tack free in about 30 minutes, while a 0.3-cm thick layer cures in less than one day. As cure progresses, strength develops slowly for about three weeks.

The original viscosity of these RTV materials depends principally on that of the polymer components and the filler loading. Filler and original polymer properties and cross-link density affect the ultimate strength of the fully cured elastomer. Most commercially available products are based on polydimethylsiloxanes. Polymers with substituents other than methyl modify and improve certain properties; e.g., trifluoropropyl groups improve solvent resistance. Some products are compounded with fillers and additives to be pourable, and others to be thixotropic. Silica-filled polydimethylsiloxane systems, lacking pigments and other additives, cure to form translucent rubbers. Since the specific gravity of silicas, generally about 2.2, exceeds that of siloxanes, generally about 1.0, the specific gravity of the RTV rubbers depends on the filler loading. Physical properties of similar cured acetoxy RTV formulations are shown in Table 12.

TABLE 12

Physical Properties of RTV Rubbers

| Specific Gravity[1] | Durometer Hardness, Shore A | Tensile Strength, MPa | Elongation, % |
|---|---|---|---|
| 1.18 | 45 | 2.4 | 180 |
| 1.30 | 50 | 3.1 | 140 |
| 1.33 | 50 | 3.4 | 200 |
| 1.37 | 55 | 3.8 | 120 |
| 1.45 | 60 | 4.5 | 110 |
| 1.45 | 60 | 5.2 | 160 |
| 1.48 | 65 | 4.8 | 110 |

[1]With increasing filler loading.

Formulations with different curing systems, polymer molecular weights and structures, cross-link densities, and other characteristics offer a broad spectrum of product properties. For example, one-component products are available with elongations as high as 1000%. Typical properties of representative cured RTV silicone rubbers are shown in Tables 13 and 14.

TABLE 13

Thermal Properties of Cured Silicone Elastomers

| | One Component | | Two Components | |
|---|---|---|---|---|
| Property | General Purpose | Construction Sealant | Adhesive Sealant | Molding Compound |
| Hardness, Shore A, durometer | 30 | 22 | 50 | 60 |
| Tensile Strength, MPa | 2.4 | 1.0 | 3.4 | 5.5 |
| Elongation, % | 400 | 850 | 200 | 220 |
| Tear Strength, J/cm$^2$ | 0.80 | 0.35 | 0.52 | 1.75 |

TABLE 14

Thermal Properties of Cured Silicone Elastomers

| Property | Typical Range |
|---|---|
| Useful temperature range, ° C. | −110 to 200 |
| with thermal stabilizers | −110 to 250 |
| Thermal conductivity, W/(m · K) | 1.7–3.4 |
| Coefficient of thermal expansion, per ° C. | 3.5 × 10$^{-5}$ |

The one-component RTV silicone rubbers are in some instances, preferred for use in the present invention golf balls, particularly for one or more interior layers. Such layers may be formed by encapsulating the core with an RTV silicone rubber material. Many formulations provide self-bonding to most metals, glass, ceramics, concrete, and plastics. For example, bonds to aluminum with >1.38 MPa (200 psi) shear strength and 0.35 J/cm$^2$ (20 lbf/in.) tear strength are obtainable. Bonding can be improved by applying a primer to the substrate. These primers are solutions of reactive silanes or resins that dry (cure) on the substrate, leaving a modified silicone bondable surface. Bond strength develops as the RTV cure progresses.

The two-component RTV silicone rubbers are commercially available in a wide range of initial viscosities, from as low as an easily pourable 100-mm$^2$/s material to as high as the stiff paste like materials of over 1,000,000 mm$^2$/s at 25°

C. Curing system, polymer molecular weight and structure, cross-link density, filler, and additives can be varied and combined, giving a group of products whose properties cover a wider range than that encompassed by the one-component products. The highest strength RTV rubbers are provided by two-component RTV technology. On the other hand, products that cure to a mere gel are also available. Unfilled resin-reinforced compositions can provide optical clarity. Polymers with phenyl, trifluoropropyl, cyanoethyl, or other substituents can be used with, or in place of, polydimethylsiloxanes for low temperature-, heat-, radiation-, and solvent-resistant elastomers.

In one-component formulations that rely for cure on the reaction between a reactive cross-linking agent and atmospheric moisture, the ingredients must be thoroughly dried, or a drying step must be included in the compounding cycle. As more filler is added during compounding, the resistance to mixing tends to peak until "wetting-in" is reached. The moisture-sensitive cross-linking agent is usually added last. However, this step can be performed separately. When the uncatalyzed base compound and cross-linking agent are mixed, the effective viscosity sometimes passes through a maximum. As the early chemical interactions are resolved, a typical consistency is obtained. Allowance for elevated effective in-process viscosities must be made when mixing equipment is specified. Silica-reinforced uncatalyzed base compounds harden (develop structure) on storage, and the addition of catalyst should not be delayed.

For two-component formulations, each part may contain varying proportions of filler and polymer. The second part contains the curing catalyst and possibly the cross-linking agent and pigments. By proper design of the compound, the proportions of first and second parts to be used may be adjusted for convenient handling and metering. Typically, from about 1 to 20 parts of the first part are typically used per part of the second.

Many commercially available two-component RTV elastomers can be advantageously cured at 50–150° C., depending on the product and intended use, but RTV is characteristic. Hydrosilation-curing RTV compositions can be modified with inhibitors to become heat-curing systems.

Unlike RTV compositions, most heat-curing silicone rubbers are based on high molecular weight polymer gums. Gums, fillers, and additives can be mixed in dough mixers or Banbury mills. Catalysts are added on water-cooled rubber mills, which can be used for the complete process in small-scale operations.

Silicone rubbers are commercially available as gums, filler-reinforced gums, dispersions, and uncatalyzed and catalyzed compounds. Dispersions or pastes may be stirred with solvents such as xylene. The following types of gums are commercially available: general purpose (methyl and vinyl), high and low temperature (phenyl, methyl, and vinyl), low compression set (methyl and vinyl), low shrink (devolatilized), and solvent resistant (fluorosilicone); properties are shown in Table 15.

The tensile strength of cured dimethylsilicone rubber gum is only about 0.34 MPa (50 psi). Finely divided silicas are used for reinforcement. Other common fillers include mined silica, titanium dioxide, calcium carbonate, and iron (III) oxide. Crystallizing segments incorporated into the polymer also serve as reinforcement. For example, block copolymers containing silphenylene segments, $-[(CH_3)_2SiC_6H_4Si(CH_3)_2O]_n-$, may have cured gum tensile strengths of 6.8–18.6 MPa (1000–2700 psi).

TABLE 15

Properties of Silicone Gums

| Type | Density $d^{25}$, g/cm³ | $T_g$, °C. | Williams Plasticity (ASTM D926) |
|---|---|---|---|
| $(CH_3)_2SiO$ | 0.98 | −123 | 95–125 |
| $CH_3(C_6H_5)SiO$ | 0.98 | −113 | 135–180 |
| $CH_3(CF_3CH_2CH_2)SiO$ | 1.25 | −65 | |

Consistencies of uncured rubber mixtures range from a tough putty to a hard deformable plastic. Those containing reinforcing fillers tend to stiffen, i.e., develop structure, on storage. Additives, such as water, diphenylsilanediol, dimethylpinacoxysilane, or silicone fluids, inhibit stiffening.

The properties of fabricated rubber depend on the gum, filler, catalyst, additives, and solvents and their proportions. A high filler content increases hardness and solvent resistance and reduces elongation. The properties also depend on the thoroughness of mixing and the degree of wetting of the filler by the gum. The properties change as cure progresses and are stabilized by devolatilization. The properties may also be affected by the environment and aging.

Before being used, silicone rubber mixtures are preferably freshened. Catalyst is added, and the mixture is freshly milled on rubber mills until the components band into smooth continuous sheets that are easily worked. Specific or custom mixtures are prepared by suppliers for particular product applications. A formula is designed to achieve some special operating or processing requirement, and formulations are classified accordingly as set forth below in Table 16.

TABLE 16

Properties of Silicone Rubber Classes

| Class | Hardness, Durometer | Tensile Strength, MPa | Elongation % | Compression set at 150° C. for 22 h, % | Useful Temperature Range, °C. Minimum | Useful Temperature Range, °C. Maximum | Tear Strength, J/cm² |
|---|---|---|---|---|---|---|---|
| General purpose | 40–80 | 4.8–7.0 | 100–400 | | −60 | 260 | 0.9 |
| Low compression set | 50–80 | 4.8–7.0 | 80–400 | 15–50 | −60 | 260 | 0.9 |
| Extreme low temperature | 25–80 | 5.5–10.3 | 150–600 | 10–15 | −100 | 260 | 3.1 |
| Extreme high temperature | 40–80 | 4.8–7.6 | 200–500 | 20–50 | −60 | 315 | |
| Wire and cable | 50–80 | 4.1–10.3 | 100–500 | 10–40 | −100 | 260 | |
| Solvent resistant | 50–60 | 5.8–7.0 | 170–225 | 20–50 | −68 | 232 | 1.3 |
| High strength flame retardant | 40–50 | 9.6–11.0 | 500–700 | 20–30 | | | 28–3 |

Silicone rubbers are cured by several mechanisms. For hydrosilation cure, high molecular weight polymers (gums) with vinyl functionality are combined with fluid hydride-functional cross-linking agents. The catalyst, such as a soluble platinum compound, is added with an inhibitor to prevent cure initiation before heating.

Silicone rubber is usually cured by heating the reinforced polymer with a free-radical generator, e.g., benzoyl peroxide.

Cure is also effected by gamma or high energy electron radiation, which causes scission of all types of bonds, including Si—O; the important cure reactions and those involving Si—C and C—H. Hydrogen, methane, and ethane evolve, and bridges between chains are formed by recombination of the radicals generated. These bridges include Si—$CH_2$—Si,Si—Si, and perhaps Si—$CH_2CH_2$—Si. An absorbed dose of 770–1300 C/kg ($3\times10^6$ to $5\times10^6$ roentgen) is typically required for effective cure. Radiation cure can be used for thick sections, but high energy electrons penetrate to a depth of only a few millimeters.

Freshly mixed silicone rubber compounds are usually molded at 100–180° C. and 5.5–10.3 MPa (800–1500 psi). Under these conditions, thermal cure can be completed in minutes. The molds are usually lubricated with a 1–2 wt % aqueous solution of a household detergent. Final properties can be developed by oven curing or by continuous steam vulcanization.

For bonding silicone rubber to other materials, such as an interior layer or core in the golf balls of the present invention, primers are preferably used, including silicate esters, silicone pastes, silicone resins, or reactive silanes. After evaporation of solvent and setting or cure of the primed surface, the rubber compounds are applied and cured under pressure. Self-bonding silicone rubber stocks require no primer.

Silicone rubber is compounded in dough mixers, Banbury mixers, two-roll rubber mills, various types of change-can mixers, and continuous compounders. Large vertical Banbury mixer systems are used for high volume semicontinuous production of dry (but not overly tacky) compounds; tackiness can create problems in unloading. The basic process requirements are similar in nearly all applications: addition of gums, fillers, process aids, pigments, and catalysts in the prescribed order; breakdown of agglomerates in the fillers; uniform dispersion of filler in the gum; and control of temperature and, in some cases, pressure for retention or removal of volatile ingredients and prevention of premature cure.

The properties of cured silicone elastomers are temperature dependent. For example, Young's modulus decreases from about 10,000 to 200 MPa ($145\times10^4$ to $2.9\times10^4$ psi) between −50 and 25° C. and remains fairly constant to 260° C. Tensile strength decreases from approximately 6.9 MPa (1000 psi) at 0° C. to 2.1 MPa (300 psi) at 300° C. The thermal conductivity of silicone rubber is usually about 1.5–4 W/(m·K) and increases with increasing filler content.

Silicone rubber (gum) films are permeable to gases and hydrocarbons; they are about 10–20 times as permeable as organic polymers. Water diffuses through lightly cross-linked gum as monomer, dimer, and trimer, with diffusion coefficients of 1.5, 3.6, and $3.1\times10^{-5}$, respectively, at 65° C.

Silicone rubber compounds are also permeable to gases. Cross-linking and fillers reduce permeability.

Solvents diffuse into silicone rubber and swell, soften, and may result in weakening of the rubber. The degree of swelling depends on the solvent and has been correlated with the solubility parameters of solvent and rubber. The correlation is improved if electrostatic interactions are considered.

Silicone elastomers appear completely hydrophobic to liquid water. Aqueous solutions interact with silicone rubber with varying effects. Water itself has little effect, although at higher temperatures it causes softening and weakening. If the rubber is heated with water in a sealed environment, it is converted to a sticky polymer.

In contrast to the silicone fluids and elastomers, silicone resins contain Si atoms with no or only one organic substituent. They are therefore crosslinkable to harder and stiffer compounds than the elastomers, but many must be handled in solution to prevent premature cure. They are, in fact, usually made by hydrolysis of the desired chlorosilane blend in the presence of a solvent such as mineral spirits, butyl acetate, toluene, or xylene. These materials are usually cured with metal soaps or amines.

As noted, silicone resins are highly cross-linked siloxane systems. The cross-linking components are introduced as trifunctional or tetrafunctional silanes in the first stage of manufacture or processing. For example, a solution of $CH_3SiCl_3$, $(CH_3)_2SiCl_2$, $C_6H_5SiCl_3$, and $(C_6H_5)_2SiCl_2$ or $CH_3(C_6H_5)SiCl_2$ in toluene is hydrolyzed to form a complex copolymer mixture, which remains in solution in toluene. The aqueous hydrochloric acid is separated, and the resin solution is washed and heated in the presence of a mild condensation catalyst to adapt (body) the resin to the proper viscosity and cure time. It is finally adjusted to specifications by distilling or adding solvents. The properties of the resins depend on the choice of chlorosilanes, the degree of cure, and the processing conditions.

The chlorosilanes for a particular resin formulation determine its characteristics. Monomethyl-, dimethyl-, monophenyl-, diphenyl-, methyl-phenyl-, monovinyl-, and methylvinylchlorosilanes, together with silicon tetrachloride, are typical chlorosilanes. Prediction of specific resin properties as a function of composition is difficult since processing and cure influence the final molecular configuration and related characteristics. However, some generalizations can be made: trifunctional siloxy units produce harder, less flexible resins, which are frequently immiscible with organic polymers; difunctional siloxy units increase softness and flexibility, and phenylsiloxanes are more miscible with organic polymers than methylsiloxanes and produce resins that are less brittle and have superior thermal resistance. Alkyl groups other than methyl also increase the compatibility with other organic materials. The effects of silanes on the properties of a film are shown in Table 17. Properties of these silanes vary considerably. Some resins are soft and flexible, and others are hard and glassy. Processing conditions vary from hydrolysis in strong acid to dilute acid or buffered aqueous systems. Alkoxysilanes can also be used to avoid acid conditions. Solvent, temperature, concentration, and catalyst for bodying and curing affect the result.

TABLE 17

Effect of Silanes on the Properties of Silicone Resin Films

| Property | $CH_3SiCl_3$ | $C_6H_5SiCl_3$ | $(CH_3)_2SiCl_2$ | $(C_6H_5)_2SiCl_2$ | $CH_3(C_6H_5)SiCl_2$ |
|---|---|---|---|---|---|
| Hardiness | increase | increase | decrease | decrease | decrease |
| Brittleness | increase | great increase | decrease | decrease | decrease |
| Stiffness | increase | increase | decrease | decrease | decrease |
| Toughness | increase | increase | decrease | decrease | decrease |
| Cure Speed | much faster | some increase | slower | much slower | slower |
| Tack | decrease | some decrease | increase | increase | increase |

Most silicone resin products require heat and catalysts for curing. During the life of the product, curing continues, and properties change with time. For this reason, silicone resins exhibiting this characteristic are generally less preferred than silicone elastomers and rubbers described herein.

Silicone resins are cured through the formation of siloxane linkages by the condensation of silanols. This is a continuation of the overall condensation process by which the resin is prepared. As condensation continues, the rate decreases because of lower silanol concentration, increased steric hindrance, and reduced mobility. For final cure, therefore, the reaction must be accelerated by heat and catalyst. Even so, some silanols remain, and slow cure continues for the life of the resin. The reaction is reversible, and water must be removed from the system to permit a high degree of cure. Many substances catalyze silanol condensation, including acids and bases; soluble organic salts of lead, cobalt, tin, iron, and other metals and organotin compounds, e.g., dibutyl tin dilaurate, or N,N,N',N'-tetramethylguanidine salts.

Silicone resins based on hydrosilation cure have also been developed. These materials cure by addition reactions and are similar in composition to hydrosilation-curing elastomers, however are generally more highly cross-linked.

Silicone resins change little on exposure to humidity, heat, and sunlight. Weather resistance is also exhibited by silicone—organic copolymers and blends, provided the silicone content is high enough.

A variety of commercially available silicone resins may be utilized in the preferred embodiment golf balls. For example, silicone resins can be obtained from Dow Corning Corp., Midland, Mich.; GE Silicones, Waterford, N.Y.; Gelest Inc., Tullytown, Pa.; Wacker Silicones, Adrian, Mich.; and Shin-Etsu Chemical Co., Ltd, Tokyo 100, Japan.

A particularly preferred commercial supplier of silicone resin is Shin-Etsu. Shin-Etsu offers a two-component, high strength molding compound under the designation KE 1300, that provides excellent resin resistance and will not shrink when cured at room temperature.

KE 1300 features high tear strength. It is ideal for intricate molds, or applications where tearing or ripping of a mold is a concern. KE 1300 is available in a T (translucent) and a white version. Properties and mold life will be the same with both. The translucent version (KE 1300T) is very useful for applications where visual sighting of the master or where identification of voids is needed. KE1300T and KE 1300 (white) are preferred whenever resistance to attack by epoxies, polyesters and urethanes and high tear strength in a medium modulus material is required.

Whenever Catalyst 1300L-3 is used to cure KE 1300 or KE 1300T, a lower modulus material results without seriously effecting tear strength. This is appropriate for those applications where demolding is a problem due to deep undercuts or thick cross-sections.

Other suitable silicone resins available from Shin-Etsu are set forth below in Table 18. The noted KE 1402, SES 412, and KE 10 are all condensation cure products. The noted KE 1300T, KE 1300, KE 1310ST, KE 1310S, KE 1600, and KE 1604 are all addition cure products. These addition cure products can be heat accelerated if a faster cure is desired. For example, a heat cure for 2 hours at 60° C. can be performed at 1 hour at 85° C.

TABLE 18

General Characteristics of Commercially Available Silicone Compositions

| Product | Color | Description | Pot Life (Hrs) | Catalyst |
|---|---|---|---|---|
| KE 1402 | Pink | Low durometer, high strength inhibition resistant | 1.5 | CAT 1402 |
| SES 412 | White | Medium durometer, low viscosity, general purpose | 0.5 | CAT RM |
| KE 10 | Off-white | High durometer, low viscosity, general purpose | 1.0 | CAT RA |
| KE 1300T | Translucent | Low durometer, high strength | 1.5 | CAT 1300L-3 |
| KE 1300T | Translucent | Medium durometer, high strength | 1.5 | CAT 1300 |

TABLE 18-continued

| | | | | |
|---|---|---|---|---|
| KE 1300 | White | Medium durometer, high strength, opaque | 1.5 | CAT 1300 |
| KE 1310ST | Translucent | Premium strength, longest mold life | 2.0 | CAT 1310 |
| KE 1310S | White | Premium strength, longest mold life, opaque | 2.0 | CAT 1310 |
| KE 1600 | Off-white | Medium durometer, general purpose | 2.0 | CAT 1300 |
| KE 1604 | Blue | High durometer, general purpose | 2.0 | CAT 1604 |
| KE 1604 | Off-white | High durometer, general purpose, neutral color | 2.0 | CAT 1604T |

Physical Properties of Commercially Available Silicone Compositions

| Product | Initial Mixed Viscosity (poise) | Hardness Durometer (Shore-A) | Tensile Strength (psi) | Elongation % | Linear Shrinkage (%) | Tear Strength (ppli) | Specific Gravity |
|---|---|---|---|---|---|---|---|
| KE 1402 | 600 | 25 | 600 | 400 | 0.4 | 120 | 1.10 |
| SES 412 | 100 | 40 | 355 | 160 | 0.2 | 45 | 1.30 |
| KE 10 | 300 | 55 | 480 | 150 | 0.1 | 45 | 1.15 |
| KE 1300T | 1000 | 30 | 630 | 400 | <0.1 | 110 | 1.11 |
| KE 1300T | 1000 | 40 | 800 | 300 | <0.1 | 125 | 1.11 |
| KE 1300 | 1000 | 40 | 800 | 300 | <0.1 | 125 | 1.11 |
| KE 1310ST | 840 | 40 | 850 | 340 | <0.1 | 140 | 1.07 |
| KE 1310S | 840 | 40 | 850 | 340 | <0.1 | 140 | 1.07 |
| KE 1600 | 1700 | 50 | 1000 | 200 | <0.1 | 80 | 1.26 |
| KE 1604 | 1000 | 60 | 1100 | 170 | <0.1 | 95 | 1.26 |
| KE 1604 | 1000 | 60 | 1100 | 170 | <0.1 | 95 | 1.26 |

Curing Properties of Commercially Available Silicone Resins

| Product | Base Curing Agent Ratio by WT. | Curing Hr/° C. |
|---|---|---|
| KE 1402 | 10:1 | 24/25 |
| SES 412 | 100:0.5 | 24/25 |
| KE 10 | 100:2.5 | 24/25 |
| KE 1300T | 10:1 | 24/25 |
| KE 1300T | 10:1 | 24/25 |
| KE 1300 | 10:1 | 24/25 |
| KE 1310ST | 10:1 | 24/25 |
| KE 1310S | 10:1 | 24/25 |
| KE 1600 | 10:1 | 24/25 |
| KE 1604 | 10:1 | 24/25 |
| KE 1604 | 10:1 | 24/25 |

When utilizing a two part, addition cure, silicone resin, typical properties of the components and cured compositions are set forth below in Table 19 as follows:

TABLE 19

Typical Properties of Two Part, Silicone Resins

| | Part A | Part B | Mixed A/B |
|---|---|---|---|
| Appearance | Milky-White Translucent | Milky-White Translucent | Milky-White Translucent |
| Specific Gravity, @25° | 1.08 + 0.04 | 1.08 + 0.04 | 1.08 + 0.04 |
| Viscosity, @25° | 500—1,000P | 1–50P | 500 ± 250P |
| Cured Properties (Cure Condition: 15 min. @150° C.): | | | |
| Hardness, Shore 00 | | | 70 ± 15 |

TABLE 19-continued

Typical Properties of Two Part, Silicone Resins

| | Part A | Part B | Mixed A/B |
|---|---|---|---|
| Tensile Strength, psi | | | 450 ± 150 |
| Elongation, % | | | 500 ± 150 |

Preferably, the silicone material utilized in the preferred embodiment golf balls exhibits, upon curing, a Shore 00 hardness of from about 55 to about 100; a tensile strength of from about 300 psi to about 600 psi; and an elongation of from about 350% to about 650%.

Figure 3:
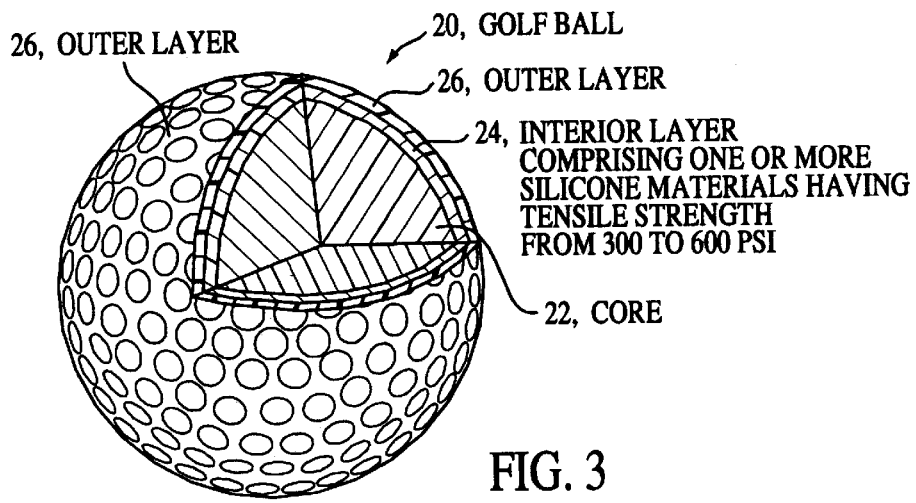
FIG. 3 is a partial cross-sectional view of another preferred embodiment golf ball in accordance with the present invention having an interior layer comprising a silicone material.

As noted, the present invention golf balls may comprise one or more interior layers comprising one or more silicone materials. Referring to FIG. 3, a preferred embodiment golf ball 20 is illustrated comprising a core 22 formed from a material as described herein, and an interior layer 24 formed from one or more silicone material(s). The interior layer 24 is disposed between the core 22 and an outer layer 26. The outer layer 26 may be in the form of the previously described multilayer cover 12.

Figure 4:
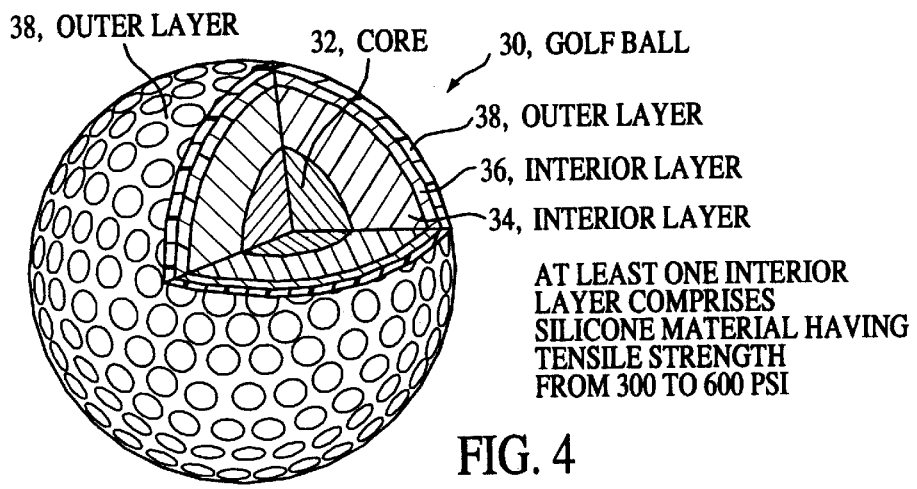
FIG. 4 is a partial cross-sectional view of another preferred embodiment golf ball in accordance with the present invention having two interior layers, at least one of which comprises a silicone material.

In another preferred embodiment, the present invention provides a golf ball 30 as shown in FIG. 4. The golf ball 30 comprises a core 32, formed from a material as described herein, and two inner layers, such as 34 and 36. Either or both of the inner layers 34 and 36 may be formed from a silicone material. The golf ball 30 may further comprise an outer layer 38 similar to the outermost multilayer cover 12.

Figure 5:
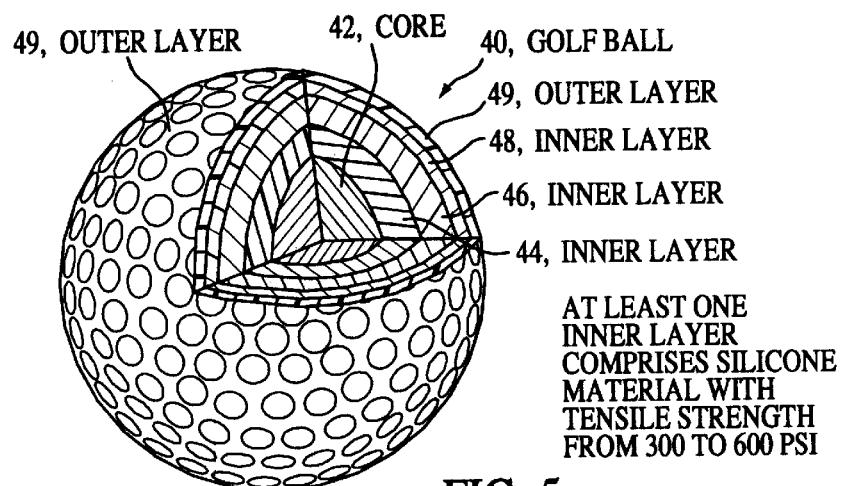
FIG. 5 is a partial cross-sectional view of yet another preferred embodiment golf ball in accordance with the present invention having three or more interior layers, at least one of which comprises a silicone material.

In yet another preferred embodiment, the present invention provides a golf ball 40 as shown in FIG. 5. The golf ball 40 comprises a core 42, formed from a material as described herein, and three or more inner layers such as layers 44, 46, and 48, that may be formed from a silicone material. The golf ball 40 may further comprise an outermost layer 49 similar to the previously described multilayer cover 12.

Although not wishing to be bound to any particular dimensions, the present inventors have determined that the one or more silicone layers preferably have the following dimensions and characteristics. When utilized in conjunction with a core of at least about 1.20 inches in diameter or greater, the total thickness of the silicone layers is at least about 0.020 inches or greater. The golf balls may utilize one or more silicone layers, however it is preferred to provide at least two or more. If the silicone layers are used in combination with one or more layers of a non-silicone composition, it is preferred that the thickness of the non-silicone layers be at least about 0.020 inches or greater. Examples of such non-silicone materials include, but are not limited to, relatively hard, resilient materials such as ionomers, nylons, thermoplastic urethanes, and hytrels for instance. The minimum total thickness of all layers within the preferred embodiment golf balls is about 0.040 inches. The preferred total thickness of all the silicone layers is about 0.050 inches.

As previously noted, the preferred embodiment golf balls of the present invention may further comprise a core comprising a silicone composition. Such material is preferably selected from the previously noted silicone materials. A particularly preferred core composition is based upon blends of ionomers as described herein and a commercially available silicone rubber, Dow Corning Silastic rubber WC-50. Silastic WC-50 comprises a low level of vinyl groups and has a specific gravity of about 1.15 and a brittleness temperature of about −39° C.

Figure 6:
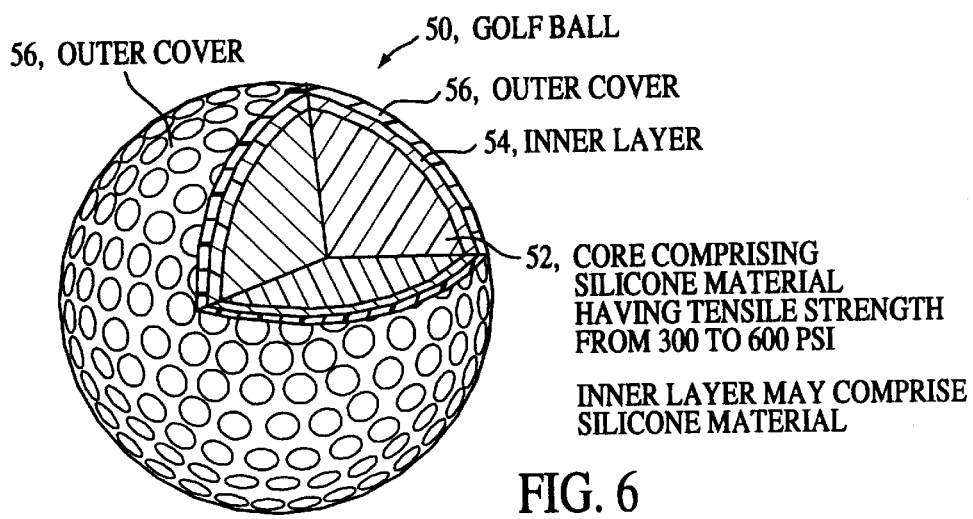
FIG. 6 is a partial cross-sectional view of another preferred embodiment golf ball in accordance with the present invention having a core comprising a silicone material.
Figure 7:
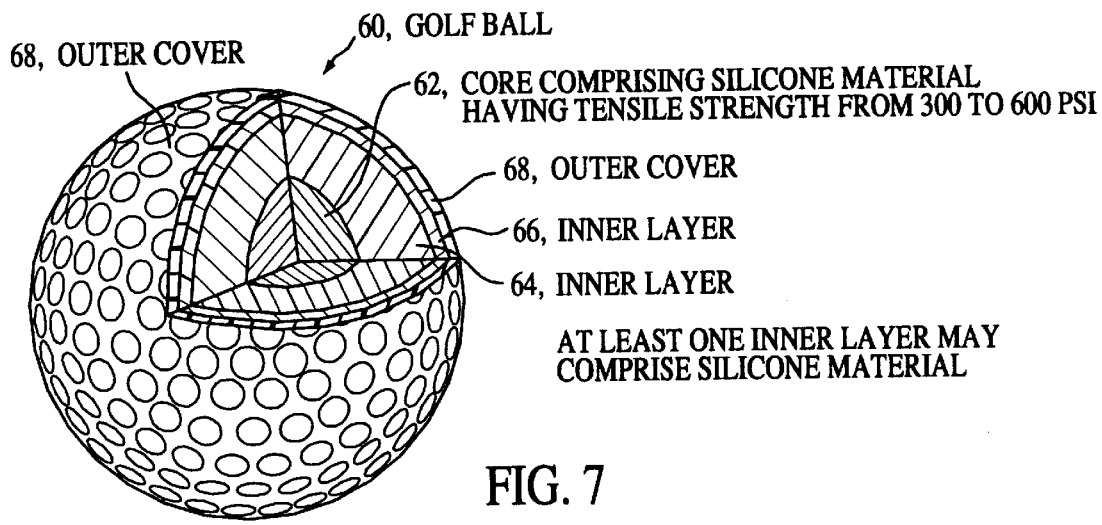
FIG. 7 is a partial cross-sectional view of another preferred embodiment golf ball in accordance with the present invention having a core comprising a silicone material and at least two interior layers.
Figure 8:
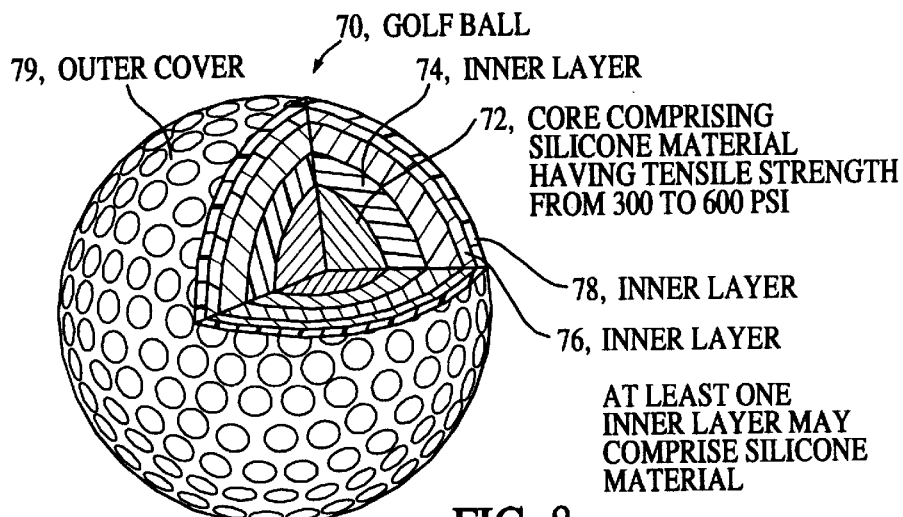
FIG. 8 is a partial cross-sectional view of yet another preferred embodiment golf ball in accordance with the present invention having a core comprising a silicone material and three or more interior layers.

Referring to FIGS. 6–8, several additional preferred embodiment golf balls are illustrated comprising cores including a silicone material and one or more inner layers comprising materials described herein. FIG. 6 illustrates a preferred embodiment golf ball 50 comprising a core 52 including a silicone material, an inner layer 54, and an outer cover 56. The outer cover 56 may be in the form of the previously described multilayer cover 12.

The invention also provides another preferred embodiment golf ball 60 illustrated in FIG. 7 comprising a core 62 formed from a silicone material, a first inner layer 64, a second inner layer 66, and an outer cover 68. The outer cover 68 may be in the form of the previously described multilayer cover 12.

FIG. 8 depicts another preferred embodiment golf ball 70 comprising a core 72, a plurality of inner layers 74, 76, and 78, and an outer cover 79. The core 72 comprises a silicone material. The outer cover 79 may be in the form of the previously described multilayer cover 12.

The core has a preferred set of characteristics as follows. The silicone core is preferably from about 1.10 inches to about 1.60 inches in diameter. When utilizing a silicone composition core, the mantle (or one or more interior layers) thickness is from about 0.020 inches to about 0.145 inches. And, the cover thickness is from about 0.020 inches to about 0.145 inches. The ball diameter is preferably from about 1.68 inches to about 1.75 inches or more in diameter. When utilizing a silicone core, the golf ball preferably includes at least two or more layers. The mantle and/or cover layers may be formed from a relatively hard resilient materials such as for example, ionomers, nylons, polyurethanes, polyester elastomers, etc.

Moreover, the present invention provides golf balls having both a core formed from a silicone material and one or more inner layers formed from a silicone material. The configuration or structure of such balls may be as depicted in FIGS. 1–8.

In preparing preferred golf balls in accordance with the present invention, a hard inner cover layer is molded (for instance by injection molding or by compression molding) about a core (preferably a solid core). A comparatively softer outer layer is molded over the inner layer. The conventional solid core is about 1.545 inches in diameter, although it can range from about 1.495 to about 1.575 inches. Conventional solid cores are typically compression molded from a slug of uncured or lightly cured elastomer composition comprising a high cis content polybutadiene and a metal salt of an a, $\alpha$, $\beta$, ethylenically unsaturated carboxylic acid such as zinc mono or diacrylate or methacrylate. To achieve higher coefficients of restitution in the core, the manufacturer may include fillers such as small amounts of a metal oxide such as zinc oxide. In addition, larger amounts of metal oxide than those that are needed to achieve the desired coefficient are often included in conventional cores in order to increase the core weight so that the finished ball more closely approaches the U.S.G.A. upper weight limit of 1.620 ounces. Other materials may be used in the core composition including compatible rubbers or ionomers, and low molecular weight fatty acids such as stearic acid. Free radical initiators such as peroxides are admixed with the core composition so that on the application of heat and pressure, a complex curing cross-linking reaction takes place.

The inner cover layer, such as layer 14 of the multilayer cover 12, which may be molded over a core or another interior layer, is about 0.100 inches to about 0.010 inches in thickness, preferably about 0.0375 inches thick. The outer cover layer, such as layer 16 of the multilayer cover 12, is about 0.010 inches to about 0.050 inches in thickness, preferably 0.0300 inches thick. Together, the core, the inner cover layer and the outer cover layer combine to form a ball having a diameter of 1.680 inches or more, the minimum diameter permitted by the rules of the United States Golf Association and weighing about 1.620 ounces.

Additional materials may be added to the cover compositions (both inner and outer cover layer) of the present invention including pigments (For example, Ultramarine Blue sold by Whitaker, Clark and Daniels of South Plainsfield, N.J.) (see U.S. Pat. No. 4,679,795); and pigments such as titanium dioxide, zinc oxide, barium sulfate and zinc sulfate; optical brighteners; and UV absorbers; antioxidants; antistatic agents; and stabilizers. Further, the cover compositions of the present invention may also contain softening agents, such as plasticizers, processing aids, etc. and reinforcing material such as glass fibers and inorganic fillers, as long as the desired properties produced by the golf ball covers are not impaired.

As previously described with regard to silicone elastomers, it may, in some instances, be preferred to incorporate one or more filler agents in the one or more inner layers comprising silicone materials. It may also be desirable to incorporate such agents in a silicone core. Incorporating such agents may serve to reinforce that resulting silicone composite material, and/or alter other physical properties of the layer and/or core. The use of such agents may serve to increase, or in some cases, decrease, one or more of the following properties: hardness, strength, rigidity, elasticity, and density. With regard to increasing the density of a silicone material utilized in the present invention golf balls, it is particularly preferred to incorporate such agents, particularly those having a relatively high density, in a silicone layer in order to increase the weight and moment inertia of the ball. Examples of suitable filler and/or weighting agents include, but are not limited to, particulate silica; fumed silica; particulate aluminum silicate or other similar materials; carbon black or graphite in fiber or powder form; boron in powder or salt form; Kevlar in fiber form; cotton flock; nylon flock; glass in nearly any form; ceramic materials in nearly any form; Cermet, i.e., ceramic-metal, materials in any form; Hi-Sil; and metals in any form. Other compounds may be used such as calcium carbonate, various clays, and plastics such as ground polypropylene. Regarding the use of metals, nearly any metal, preferably in fine particulate form, may be utilized. Examples of suitable metals include aluminum, magnesium, beryllium, iron, titanium, tungsten, copper, zinc, and alloys or oxides thereof. Examples of such alloys include brass or bronze. It is also contemplated to utilize other materials as filler, weighting, or reinforcing agents such as metal stearate salts, silicon carbide, ceramic whiskers, and combinations thereof. Furthermore, the present inventors have identified several preferred metallic compounds and combinations of materials for incorporation in the one or more silicone material layers and/or core. These preferred combinations include, but are not limited to: beryllium oxide, aluminum oxide, titanium dioxide and graphite powder, titanium dioxide and ceramic powder, and combinations thereof.

The various cover composition layers of the present invention may be produced according to conventional melt blending procedures. In the case of the outer cover layer, when a blend of hard and soft, low acid ionomer resins are utilized, the hard ionomer resins are blended with the soft ionomeric resins and with a master batch containing the desired additives in a Banbury mixer, two-roll mill, or extruder prior to molding. The blended composition is then formed into slabs and maintained in such a state until molding is desired. Alternatively, a simple dry blend of the pelletized or granulated resins and color master batch may be prepared and fed directly into the injection molding machine where homogenization occurs in the mixing section of the barrel prior to injection into the mold. If necessary, further additives such as an inorganic filler, etc., may be added and uniformly mixed before initiation of the molding process. A similar process is utilized to formulate the high acid ionomer resin compositions used to produce the inner cover layer.

The golf balls of the present invention can be produced, at least in part, by molding processes currently known in the golf ball art. Specifically, the golf balls can be produced by injection molding or compression molding the inner cover layer about wound or solid molded cores to produce an intermediate golf ball having a diameter of about 1.50 to 1.67 inches, preferably about 1.620 inches. The outer layer is subsequently molded over the inner layer to produce a golf ball having a diameter of 1.680 inches or more. Although either solid cores or wound cores can be used in the present invention, as a result of their lower cost and superior performance, solid molded cores are preferred over wound cores.

In compression molding, the inner cover composition is formed via injection at about 380° F. to about 450° F. into smooth surfaced hemispherical shells which are then positioned around the core in a mold having the desired inner cover thickness and subjected to compression molding at 200° F. to 300° F. For about 2 to 10 minutes, followed by cooling at 50° F. to 70° F. For about 2 to 7 minutes to fuse the shells together to form a unitary intermediate ball. In addition, the intermediate balls may be produced by injection molding wherein the inner cover layer is injected directly around the core placed at the center of an intermediate ball mold for a period of time in a mold temperature of from 50° F. to about 100° F. Subsequently, the outer cover layer is molded about the core and the inner layer by similar compression or injection molding techniques to form a dimpled golf ball of a diameter of 1.680 inches or more.

Molding or otherwise forming the silicone layers and/or core may further entail additional considerations such as follows. A silicone mantle could be applied directly over a core, either a core comprising a silicone composition or as otherwise described herein, or sandwiched between two or more non-silicone layers. There are several considerations or practices that may be followed in a preferred technique for molding a core and/or one or more layers comprising a silicone material.

A vessel which is pressure-rated and of adequate size to degas the desired amount of silicone material is preferably employed. A vacuum system is used to pull or otherwise remove air induced during the mixing cycle from the material. This process insures a void-free molded component.

An oven can be used to accelerate the cure rate of the silicone material. Oven temperature should not exceed 200° C. (396° F.). Most silicone molded materials should not be exposed to elevated temperatures for more than 2 hours.

Certain chemicals, curing agents, plasticizers and materials can inhibit cure. The most common are: organo-tin and other organo-metallic compounds; silicone rubber containing organo-tin catalyst; sulfur, polysulfides, polysulfones and other sulfur-containing materials; amines, urethanes, and amine containing materials; and unsaturated hydrocarbon plasticizers.

Should a substrate or material be a possible cause of inhibition, it is best to test a small sample for compatibility with the elastomer. The presence of liquid or uncured product at the interface between the suspect substrate and the cured elastomer would indicate cure inhibition.

After molding, the golf balls produced may undergo various further processing steps such as buffing, painting and marking as disclosed in U.S. Pat. No. 4,911,451.

The resulting golf ball produced from the high acid ionomer resin inner layer and the relatively softer, low flexural modulus outer layer provide for an improved multi-layer golf ball which provides for desirable coefficient of restitution and durability properties while at the same time offering the feel and spin characteristics associated with soft balata and balata-like covers of the prior art.

Additional details of the chemistry and processing of silicone materials are provided in "Encyclopedia of Polymer Science and Engineering," Vol. 15, Second Edition, pages 204–308, by B. Hardman and A. Torkelson, herein incorporated by reference.

The present invention is further illustrated by the following examples in which the parts of the specific ingredients are by weight. It is to be understood that the present invention is not limited to the examples, and various changes and modifications may be made in the invention without departing from the spirit and scope thereof.

EXAMPLES

Several intermediate balls (cores plus inner cover layers) were prepared in accordance with molding procedures described above. The inner cover compositions were molded around 1.545 inch diameter cores weighing 36.5 grams such that the inner cover had a wall thickness of about 0.0675 inches, with the overall ball measuring about 1.680 inches in diameter.

The cores utilized in the examples were comprised of the following ingredients: high cis-polybutadiene, zinc diacrylate, zinc oxide, zinc stearate, peroxide, calcium carbonate, etc. The molded cores exhibited Riehle compressions of about 60 and C.O.R. values of about 0.800. A representative formulation of the molded cores is set forth below in Table 20:

TABLE 20

Representative Formulation For Molded Core

| MATERIAL | WEIGHT |
|---|---|
| BR-1220 (high cis-polybutadiene) | 70.70 |
| Taktene 220 (high cis-polybutadiene) | 29.30 |
| React Rite ZDA (zinc diacrylate) | 31.14 |
| Zinc Oxide | 6.23 |
| Zinc Stearate | 20.15 |
| Limestone | 17.58 |
| Ground Flash (20–40 Mesh) | 20.15 |
| Blue Master batch | .012 |
| Luperco 231XL or Trigonox 29/40 | .89 |
| Papi 94 | .50 |

[1] Blue Master batch consists of unknown compositions used only For internal identification purposes and has no effect on physical properties.

The inner cover compositions designated herein as compositions A-E utilized to formulate the intermediate balls are set forth in Table 21 below. The resulting molded intermediate balls were tested to determine the individual compression (Riehle), C.O.R., Shore C hardness, spin rate and cut resistance properties. These results are also set forth in Table 8 below.

The data of these examples are the average of twelve intermediate balls produced for each example. The properties were measured according to the following parameters:

Coefficient of restitution (C.O.R.) was measured by firing the resulting golf ball in an air canon at a velocity of 125 feet per second against a steel plate positioned 12 feet from the muzzle of the canon. The rebound velocity was then measured. The rebound velocity was divided by the forward velocity to give a coefficient of restitution.

Shore hardness was measured in accordance with ASTM test 2240.

Cut resistance was measured in accordance with the following procedure: A golf ball is fired at 135 feet per second against the leading edge of a pitching wedge wherein the leading edge radius is 1/32 inch, the loft angle is 51 degrees, the sole radius is 2.5 inches and the bounce angle is 7 degrees.

The cut resistance of the balls tested herein was evaluated on a scale of 1 to 5. The number 1 represents a cut that extends completely through the cover to the core. A 2 represents a cut that does not extend completely through the cover but that does break the surface. A 3 does not break the surface of the cover but does leave a permanent dent. A 4 leaves only a slight crease which is permanent but not as severe as 3. A 5 represents virtually no visible indentation or damage of any sort.

The spin rate of the golf ball was measured by striking the resulting golf balls with a pitching wedge or 9 iron wherein the club head speed is about 105 feet per second and the ball is launched at an angle of 26 to 34 degrees with an initial velocity of about 110 to 115 feet per second. The spin rate was measured by observing the rotation of the ball in flight using stop action Strobe photography.

Initial velocity is the velocity of a ball when struck at a hammer speed of 143.8 feet per second in accordance with a test as prescribed by the U.S.G.A.

As will be noted, compositions A, B and C include high acid ionomeric resins, with composition B further including zinc stearate. Composition D represents the inner layer (i.e. Surlyn 1605) used in U.S. Pat. No. 4,431,193. Composition E provides a hard, low acid ionomeric resin.

The purpose behind producing and testing the balls of Table 21 was to provide a subsequent comparison in properties with the multi-layer golf balls of the present invention.

TABLE 21

Molded Intermediate Golf Balls

| Ingredients of Inner Cover Compositions | A | B | C | D | E |
|---|---|---|---|---|---|
| Iotek 959 | 50 | 50 | — | — | — |
| Iotek 960 | 50 | 50 | — | — | — |
| Zinc Stearate | — | 50 | — | — | — |
| Surlyn 8162 | — | — | 75 | — | — |
| Surlyn 8422 | — | — | 25 | — | — |
| Surlyn 1605 | — | — | — | 100 | — |
| Iotek 7030 | — | — | — | — | 50 |
| Iotek 8000 | — | — | — | — | 50 |
| Properties of Molded Intermediate Balls | | | | | |
| Compression | 58 | 58 | 60 | 63 | 62 |
| C.O.R. | .811 | .810 | .807 | .793 | .801 |
| Shore C Hardness | 98 | 98 | 97 | 96 | 96 |
| Spin Rate (R.P.M.) | 7,367 | 6,250 | 7,903 | 8,337 | 7,956 |
| Cut Resistance | 4–5 | 4–5 | 4–5 | 4–5 | 4–5 |

As shown in Table 21 above, the high acid ionomer resin inner cover layer (molded intermediate balls A–C) have lower spin rates and exhibit substantially higher resiliency characteristics than the low acid ionomer resin based inner cover layers of balls D and E.

Multi-layer balls in accordance with the present invention were then prepared. Specifically, the inner cover compositions used to produce intermediate golf balls from Table 21 were molded over the solid cores to a thickness of about 0.0375 inches, thus forming the inner layer. The diameter of the solid core with the inner layer measured about 1.620 inches. Alternatively, the intermediate golf balls of Table 21 were ground down using a centerless grinding machine to a size of 1.620 inches in diameter to produce an inner cover layer of 0.0375 inches.

The size of 1.620 inches was determined after attempting to mold the outer cover layer to various sizes (1.600", 1.610", 1.620", 1.630" and 1.640") of intermediate (core plus inner layer) balls. It was determined that 1.620" was about the largest "intermediate" ball (i.e., core plus inner layer) which could be easily molded over with the soft outer layer materials of choice. The goal herein was to use as thin an outer layer as necessary to achieve the desired playability characteristics while minimizing the cost of the more expensive outer materials. However, with a larger diameter final golf ball and/or if the cover is compression molded, a thinner cover becomes feasible.

With the above in mind, an outer cover layer composition was blended together in accordance with conventional blending techniques. The outer layer composition used For this portion of the example is a relatively soft cover composition such as those listed in U.S. Pat. No. 5,120,791. An example of such a soft cover composition is a 45% soft/55% hard low acid ionomer blend designated by the inventor as "TE-90". The composition of TE-90 is set forth below in Table 22 as follows:

TABLE 22

Outer Cover Layer Composition TE-90

| Iotek 8000 | 22.7 weight % |
|---|---|
| Iotek 7030 | 22.7 weight % |
| Iotek 7520 | 45.0 weight % |
| White MB1 | 9.6 weight % |

[1]White MB consists of about 23.77 weight percent $TiO_2$; 0.22 weight percent Uvitex OB, 0.03 weight percent Santonox R, 0.05 weight percent Ultramarine blue and 75.85 weight percent Iotek 7030.

The above outer layer composition was molded around each of the 1.620 diameter intermediate balls comprising a core plus one of compositions A–D, respectively. In addition, for comparison purposes, Surlyn® 1855 (new Surlyn® 9020), the cover composition of the '193 patent, was molded about the inner layer of composition D (the intermediate ball representative of the '193 patent). The outer layer TE-90 was molded to a thickness of approximately 0.030 inches to produce a golf ball of approximately 1.680 inches in diameter. The resulting balls (a dozen balls For each example) were tested and the various properties thereof are set forth in Table 23 as follows:

TABLE 23

| | Finished Balls | | | | |
|---|---|---|---|---|---|
| Ingredients: | 1 | 2 | 3 | 4 | 5 |
| Inner Cover Composition | A | B | C | D | D |
| Outer Cover Composition | TE-90 | TE-90 | TE-90 | TE-90 | Surlyn ® 9020 |
| Properties of Molded Finished Balls: | | | | | |
| Compression | 63 | 63 | 69 | 70 | 61 |
| C.O.R. | .784 | .778 | .780 | .770 | .757 |
| Shore C Hardness | 88 | 88 | 88 | 88 | 89 |
| Spin (R.P.M.) | 8,825 | 8,854 | 8,814 | 8,990 | 8,846 |
| Cut Resistance | 3–4 | 3–4 | 3–4 | 3–4 | 1–2 |

As it will be noted in finished balls 1–4, by creating a multi-layer cover utilizing the high acid ionomer resins in the inner cover layer and the hard/soft low acid ionomer resin in the outer cover layer, higher compression and increased spin rates are noted over the single layer covers of Table 21. In addition, both the C.O.R. and the Shore C hardness are reduced over the respective single layer covers of Table 21. This was once again particularly true with respect to the multi-layered balls containing the high acid ionomer resin in the inner layer (i.e. finished balls 1–5). In addition, with the exception of prior art ball 5 (i.e. the '193 patent), resistance to cutting remains good but is slightly decreased. As note above, the prior art ball of the '193 patent suffers substantially in durability (as well as in resiliency) in comparison to the balls of the present invention.

Furthermore, it is also noted that the use of the high acid ionomer resins as the inner cover material produces a substantial increase in the finished balls overall distance properties. In this regard, the high acid ionomer resin inner covers of balls 1–3 produce an increase of approximately 10 points in C.O.R. over the low acid ionomer resin inner covers of balls 4 and about a 25 point increase over the prior art balls 5. Since an increase in 3 to 6 points in C.O.R. results in an average increase of about 1 yard in distance, such an improvement is deemed to be significant.

Several other outer layer formulations were prepared and tested by molding them around the core and inner cover layer combination to form balls each having a diameter of about 1.68 inches. First, B. F. Goodrich Estane® X-4517 polyester polyurethane was molded about the core molded with inner layer cover formulation A. DuPont Surlyn®9020 was molded about the core which was already molded with inner layer D. Similar properties tests were conducted on these golf balls and the results are set forth in Table 24 below:

TABLE 24

| Ingredients: | 6 | 7 |
|---|---|---|
| Inner Cover Layer Composition | A | D |
| Outer Cover Layer Composition | Estane ® 4517 | Surlyn ® 9020 |
| Properties of Molded Finished Balls: | | |
| Compression | 67 | 61 |
| C.O.R. | .774 | .757 |
| Shore C Hardness | 74 | 89 |
| Spin (R.P.M.) | 10,061 | 8,846 |
| Cut Resistance | 3–4 | 1–2 |

The ball comprising inner layer formulation D and Surlyn® 9020 identifies the ball in the Nesbitt U.S. Pat. No. 4,431,193. As is noted, the example provides for relatively high softness and spin rate though it suffers from poor cut resistance and low C.O.R. This ball is unacceptable by today's standards.

As for the Estane® X-4517 polyester polyurethane, a significant increase in spin rate over the TE-90 cover is noted along with an increased compression. However, the C.O.R. and Shore C values are reduced, while the cut resistance remains the same. Furthermore, both the Estane® X-4517 polyester polyurethane and the Surlyn® 9020 were relatively difficult to mold in such thin sections.

In yet another series of experiments, golf ball cores comprising a silicone material were formed in accordance with the present invention. Shinetsu X-832-071-1 silicone material (base and catalyst) was obtained and a silicone molding material was prepared. The material was degassed for approximately 7 to 10 minutes. The flowable material was then transferred into hemispherical, or nearly so, molding cavities. The molding cavities are Teflon coated. An excess of material was deposited into each molding cavity to form a positive meniscus. The molds, filled with silizone molding material, are placed in an oven for about 4 to about 6 minutes until the skins form on the silicone material. Each of the molded silicone hemispheres are then joined to another corresponding silicone molded hemisphere. Registration and placement of the molded halves may be controlled by conventional clamping assemblies. While compressed together, the molded assembly is returned to the oven for approximately minutes. After sufficient curing, the molded assembly is cooled by immersion or spraying with cool water. The Shore 00 hardness of the resulting molded core was 98.

A silicone layer, molded about a core, was formed as follows in accordance with the present invention. Shinetsa X-832-071-1 silicone molding material was appropriately prepared and degassed. The flowable material was transferred into hemispherical, Teflon coated molding cavities. Each mold is filled until about one-third full. The partially filled molds are placed in an oven and heated until a skin forms upon the silicone molding material. The molds are then removed from the oven. A preformed core, either conventional or a silicone core as described herein, is then appropriately positioned within each mold, centered and partially contacting the skinned silicone material. The core is preferably pressed downward into the mold until the silicone material raises, preferably to the top (or brim) of the hemispherical molding cavity. Another partially filled mold containing skinned silicone material, is then placed over the core and other mold half. Conventional clamping assemblies may be employed to ensure proper registration of the halves. The resulting assembly is then placed in an oven for approximately 25 minutes until the silicone layer is sufficiently cured. The molded product is removed and cooled with water. The Shore 00 hardness was 100.

In yet another series of experiments, golf balls in accordance with the present invention were prepared as set forth below and in Table 25.

Silicone base and catalyst were thoroughly mixed and then degassed for 7–10 minutes. Mixed material was poured into 1.40" diameter half shells and these were placed in an oven to skin over. They were then removed and the two halves were clamped together to form a whole core and placed back in the oven for final cure. After curing, a mantle layer was formed over the cores via injection in two sizes, 1.71" and 1.72". Static data was measured after each stage and is listed below.

TABLE 25

Multi-layer Golf Ball With Silicone Rubber Core

| Core | Example A | Example B |
|---|---|---|
| Material | Shinetsu X-832-071-1 | Shinetsu X-832-071- |
| Size | 1.400" | 1.400" |
| Weight | 25.2 g | 25.2 g |
| Shore 00 | 82 | 82 |
| 100" Drop Rebound | 54" | 54" |
| Mantle or Interior Layer | | |
| Materials | 50 pph | 50 pph |
| Iotek 1002 | 50 pph | 50 pph |
| Iotek 1003 | 1.57" | 1.57" |
| Size | 0.085" | 0.085" |
| Thickness | 34.5 g | 34.5 g |
| Weight | *1 | *1 |
| Comp | 643 | 643 |
| COR | 70–71 | 70–71 |
| Shore D | | |
| Molded Ball | | |
| Materials | 38 pph | 38 pph |
| Iotek 1002 | 52.6 pph | 52.6 pph |
| Iotek 1003 | 9.4 pph | 9.4 pph |
| TG MB | 171" | 1.72" |

TABLE 25-continued

Multi-layer Golf Ball With Silicone Rubber Core

| Core | Example A | Example B |
|---|---|---|
| Size | 0.070" | 0.075" |
| Cover Thickness | 43.2 | 44.1 |
| Weight | 90 | 90 |
| Comp | 728 | 731 |
| COR | 70 | 70 |
| Shore D | | |

*1-Mantle were too soft to measure using the Riehle compression tester.

The invention has been described with reference to the preferred embodiment. Obviously, modifications and alterations will occur to others upon reading and understanding the proceeding detailed description. It is intended that the invention be construed as including all such modifications and alterations insofar as they come within the scope of the appended claims or the equivalents thereof.

We claim:

1. A golf ball comprising:

a core;

a cover layer; and at least one interior layer surrounding said core and disposed between said core and said cover layer;

wherein at least one of said core and said at least one interior layer comprises a silicone material selected from the group consisting of silicone polymers, silicone fluids, silicone elastomers, silicone resins, and combinations thereof, said silicone material, upon curing, having a tensile strength of from about 300 psi to about 600 psi.

2. A golf ball according to claim 1 wherein said silicone material is a silicone polymer.

3. A golf ball according to claim 1 wherein said silicone material is a silicone elastomer.

4. A golf ball according to claim 1 wherein said silicone material is a silicone resin.

5. A golf ball according to claim 1 wherein said cover layer comprises an inner cover layer molded on said at least one interior layer, and an outer cover layer molded on said inner cover layer.

6. A golf ball according to claim 1, wherein the interior layer has a thickness of about 0.100 to about 0.010 inches and the cover layer has a thickness of about 0.010 to about 0.05 inches, the golf ball having an overall diameter of 1.680 inches or more.

7. A golf ball according to claim 6 wherein the interior layer has a thickness of about 0.0375 inches and the cover layer has a thickness of about 0.0300 inches, the golf ball having an overall diameter of 1.680 inches or more.

8. A golf ball according to claim 1 wherein said silicone material, upon curing, has a Shore 00 hardness of from about 55 to about 100.

9. A golf ball according to claim 1 wherein said silicone material, upon curing, exhibits an elongation of from about 350% to about 650%.

10. A golf ball according to claim 1, wherein said at least one interior layer is one layer in number.

11. A golf ball according to claim 10, wherein said interior layer comprises a silicone material.

12. A golf ball according to claim 10, wherein said core comprises a silicone material.

13. A golf ball according to claim 10, wherein said core and said interior layer comprise a silicone material.

14. A golf ball according to claim 1, wherein said at least one interior layer is two layers in number.

15. A golf ball according to claim 14, wherein at least one of said interior layers comprises silicone material.

16. A golf ball according to claim 14, wherein said core comprises silicone material.

17. A golf ball according to claim 14, wherein said core and at least one interior layer comprise a silicone material.

18. A golf ball according to claim 1, wherein said at least one interior layer is three layers in number.

19. A golf ball according to claim 18, wherein at least one of said interior layers comprises a silicone material.

20. A golf ball according to claim 18, wherein said core comprises a silicone material.

21. A golf ball according to claim 18, wherein said core and at least one interior layer comprise a silicone material.

22. A golf ball comprising:

a core comprising a silicone material;

an inner cover layer molded on said core;

an outer cover layer molded on said inner cover layer; and at least one interior layer disposed between said core and said outer cover layer, said interior layer comprising a silicone material having a tensile strength upon curing of from about 300 psi to about 600 psi.

23. A golf ball according to claim 22, wherein the inner cover layer has a thickness of about 0.375 to about 0.010 inches and the outer cover layer has a thickness of about 0.010 to about 0.375 inches, the golf ball having an overall diameter of 1.680 inches or more.

24. A golf ball according to claim 23 wherein the inner cover layer has a thickness of about 0.030 to 0.375 inches and the outer cover layer has a thickness of about 0.030 to 0.375 inches, the golf ball having an overall diameter of 1.680 inches or more.

25. A golf ball according to claim 22 wherein the outer layer composition includes 90 to 10 percent by weight of a hard high modulus ionomer resin and about 10 to 90 percent by weight of a soft low modulus ionomer resin.

26. A golf ball according to claim 25 wherein the outer layer composition includes 75 to 25 percent by weight of the hard high modulus ionomer resin and about 25 to 75 percent by weight of the soft low modulus ionomer resin.

27. A golf ball according to claim 23 wherein said silicone material, upon curing, has a Shore 00 hardness of from about 55 to about 100.

28. A golf ball according to claim 22 wherein silicone material, upon curing, exhibits an elongation of from about 350 to about 650%.

29. A golf ball according to claim 22, wherein said at least one interior layer is one layer in number.

30. A golf ball according to claim 29, wherein said interior layer comprises a silicone material.

31. A golf ball according to claim 29, wherein said core comprises a silicone material.

32. A golf ball according to claim 29, wherein said core and said interior layer comprise a silicone material.

33. A golf ball according to claim 22, wherein said at least one interior layer is two layers in number.

34. A golf ball according to claim 33, wherein at least one of said interior layers comprises silicone material.

35. A golf ball according to claim 33, wherein said core comprises silicone material.

36. A golf ball according to claim 33, wherein said core and at least one interior layer comprise a silicone material.

37. A golf ball according to claim 22, wherein said at least one interior layer is three layers in number.

38. A golf ball according to claim 37, wherein at least one of said interior layers comprises a silicone material.

39. A golf ball according to claim 37, wherein said core comprises a silicone material.

40. A golf ball according to claim 37, wherein said core and at least one interior layer comprise a silicone material.

41. A golf ball comprising:

a core;

a cover layer; and at least one interior layer surrounding said core and disposed between said core and said cover layer;

wherein at least one of said core and said interior layer comprises a silicone material selected from the group consisting of silicone polymers, silicone fluids, silicone elastomers, silicone resins, and combinations thereof, said silicone material, upon curing, having a tensile strength of from about 300 psi to about 600 psi, an elongation of from about 350% to about 650%, and a Shore 00 hardness from about 55 to about 100.

42. A golf ball according to claim 41, wherein said silicone material is a silicone polymer.

43. A golf ball according to claim 41, wherein said silicone material is a silicone elastomer.

44. A golf ball according to claim 41, wherein said silicone material is a silicone resin.

45. A golf ball according to claim 41, wherein said at least one interior layer is one layer in number.

46. A golf ball according to claim 45, wherein said interior layer comprises a silicone material.

47. A golf ball according to claim 45, wherein said core comprises a silicone material.

48. A golf ball according to claim 45, wherein said core and said interior layer comprise a silicone material.

49. A golf ball according to claim 41, wherein said at least one interior layer is two layers in number.

50. A golf ball according to claim 44, wherein at least one of said interior layers comprises silicone material.

51. A golf ball according to claim 44, wherein said core comprises silicone material.

52. A golf ball according to claim 49, wherein said core and at least one interior layer comprise a silicone material.

53. A golf ball according to claim 41, wherein said at least one interior layer is three layers in number.

54. A golf ball according to claim 53, wherein at least one of said interior layers comprises a silicone material.

55. A golf ball according to claim 53, wherein said core comprises a silicone material.

56. A golf ball according to claim 53, wherein said core and at least one interior layer comprise a silicone material.

* * * * *

UNITED STATES PATENT AND TRADEMARK OFFICE
CERTIFICATE OF CORRECTION

PATENT NO. : 6,159,110
DATED : December 12, 2000
INVENTOR(S) : Michael J. Sullivan, Viktor Keller and Mark Binette It is certified that error appears in the above-identified patent and that said Letters Patent is hereby corrected as shown below:

Inventors: "Viutor" should read -- Viktor --.

Signed and Sealed this

Second Day of October, 2001

*Attest:*

*Nicholas P. Godici*

NICHOLAS P. GODICI
*Attesting Officer*     *Acting Director of the United States Patent and Trademark Office*